(12) United States Patent
Pellerano et al.

(10) Patent No.: US 12,494,783 B2
(45) Date of Patent: Dec. 9, 2025

(54) QUANTUM COMPUTING SYSTEMS, APPARATUS, AND METHODS

(71) Applicant: Intel Corporation, Santa Clara, CA (US)

(72) Inventors: Stefano Pellerano, Beaverton, OR (US); Christopher Hull, Portland, OR (US); Todor Mladenov, Portland, OR (US); JongSeok Park, Hillsboro, OR (US); Ilya Klochkov, St. Petersburg (RU); Sushil Subramanian, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 18/028,513

(22) PCT Filed: Sep. 25, 2020

(86) PCT No.: PCT/US2020/052944
§ 371 (c)(1),
(2) Date: Oct. 3, 2023

(87) PCT Pub. No.: WO2022/066176
PCT Pub. Date: Mar. 31, 2022

(65) Prior Publication Data
US 2024/0022248 A1    Jan. 18, 2024

(51) Int. Cl.
| H03K 17/92 | (2006.01) |
| G06N 10/40 | (2022.01) |
| H03F 3/21 | (2006.01) |
| H03M 1/66 | (2006.01) |

(52) U.S. Cl.
CPC ............ *H03K 17/92* (2013.01); *G06N 10/40* (2022.01); *H03F 3/21* (2013.01); *H03M 1/66* (2013.01)

(58) Field of Classification Search
CPC ...... H03K 17/92; H03K 3/013; H03K 5/1252; H03K 17/16; G06N 10/40; H03F 3/21; H03M 1/66; H03H 11/1204
See application file for complete search history.

(56) References Cited

U.S. PATENT DOCUMENTS

| 10,192,168 | B2 | 1/2019 | Rigetti et al. |
| 2018/0145631 | A1 | 5/2018 | Berkley et al. |
| 2020/0201379 | A1 | 6/2020 | Hogaboam et al. |
| 2021/0342726 | A1* | 11/2021 | Chakraborty ........... G06F 1/206 |
| 2022/0201379 | A1 | 6/2022 | Trotter et al. |

OTHER PUBLICATIONS

PCT Notification of Transmittal of the International Search Report and the Written Opinion of the International Searching Authority, or the Declaration from PCT/US20207/052944, mailed Jun. 18, 2021, 11 pages.

(Continued)

*Primary Examiner* — Jung Kim
(74) *Attorney, Agent, or Firm* — NICHOLSON DE VOS WEBSTER & ELLIOTT LLP

(57) ABSTRACT

Apparatus and methods for interfacing an integrated qubit control chip and a solid state qubit; detecting a qubit state with a transition pulse histogram; high resolution and high speed rectangular pulse generation; large-scale spin qubit state readout; and activity-based clock control.

9 Claims, 30 Drawing Sheets

(56) References Cited

OTHER PUBLICATIONS

Jin Lin et al., 'Scalable and customizable arbitrary waveform generator for superconducting quantum computing', AIP Advances 9, 115309, Nov. 18, 2019, pp. 2-4.
Bishnu Patra et al., '19.1 A Scalable Cryo-CMOS 2-to-20GHz Digitally Intensive Controller for 4x32 Frequency Multiplexed Spin Qubits/Transmons in 22nm FinFET Technology for Quantum Computers', 2020 IEEE International Solid-State Circuits Conference, Session 19, Apr. 13, 2020, p. 304.
Conrad Roman et al., 'Coherent control for qubit state readout', New Journal of Physics, The open access journal at the forefront of physics, vol. 22, Jul. 23, 2020, pp. 2-3.
Bishnu et al., "Cryo-CMOS Circuits and Systems for Quantum Computing Applications", IEEE Journal of Solid-State Circuits, vol. 53, No. 1, Jan. 1, 2018, pp. 309-321.
International Preliminary Report on Patentability, PCT App. No. PCT/US2020/052944, Apr. 6, 2023, 7 pages.
Search Report, NL App. No. 2029024, Apr. 4, 2022, 12 pages.
Chong et al., "Programming Languages and Compiler Design for Realistic Quantum Hardware", Nature, vol. 549, Sep. 14, 2017, pp. 180-187.
Fu et al., "A Heterogeneous Quantum Computer Architecture", Proceedings of the ACM International Conference on Computing Frontiers, May 2016, 9 pages.
Fu et al., "A Microarchitecture for a Superconducting Quantum Processor", IEEE Micro, vol. 38, No. 3, May/Jun. 2018, pp. 40-47.
O'Malley et al., "Scalable Quantum Simulation of Molecular Energies", Physical Review X, vol. 6, No. 3, 2016, pp. 031007-1-031007-13.

\* cited by examiner

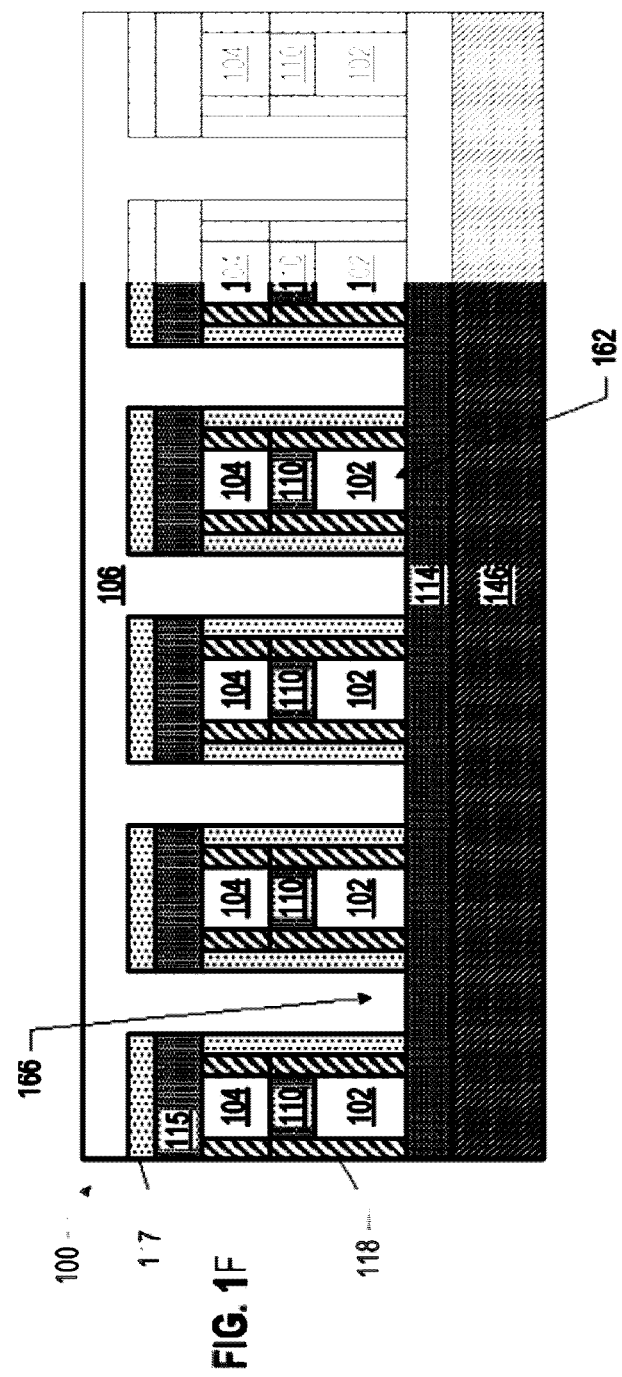

```
for k from 0 to NR-1 do
  for i from 0 to NQ-1 do
    h_x[i] ← random real number within [-1,1]    # floating point op
    h_y[i] ← random real number within [-1,1]    # floating point op
    a[i] ← 0
  end for
  for j from 0 to NP-1 do
    for i from 0 to NQ-1 do
      Initialize(q[i])
    end for
    prep params (h_x, h_y, ...)
    for i from 0 to NT-1 do
      Q(params)      # Figure 3, "Quantum circuit for many-body disordered Hamiltonian"
    end for
    for i from 0 to NQ-1 do
      a[i] ← a[i] + Measure(q[i])       # quantum op, "Qubit measurement"
    end for
  end for
  for i from 0 to NQ-1 do
    Pr[i] ← a[i] / NP;                  # floating point op
  end for
  compute system properties from Pr.    # floating point op
end for
```

*FIG. 5B*

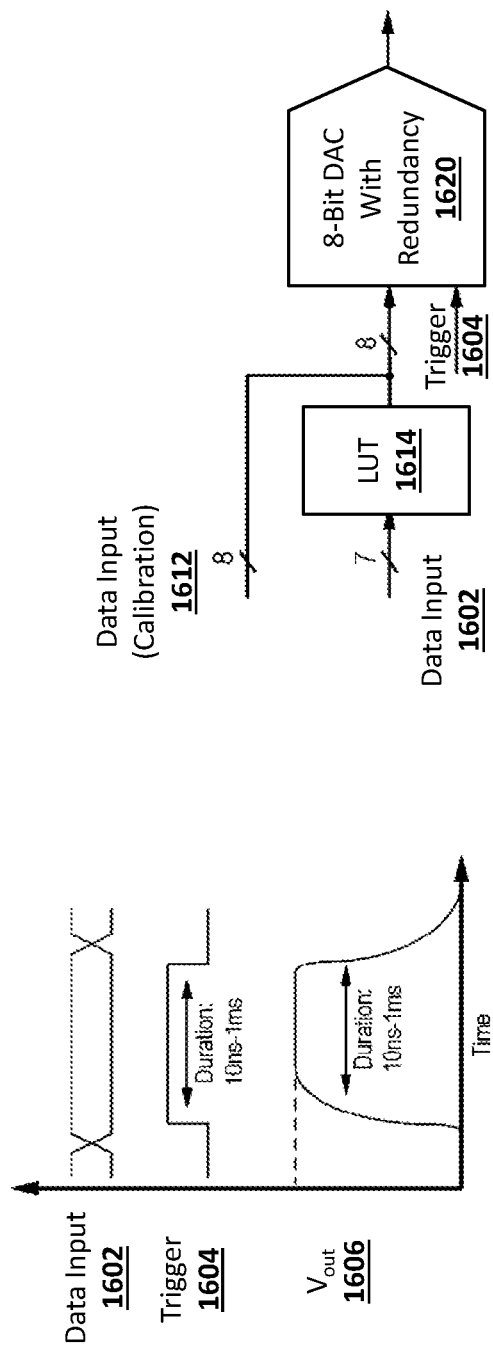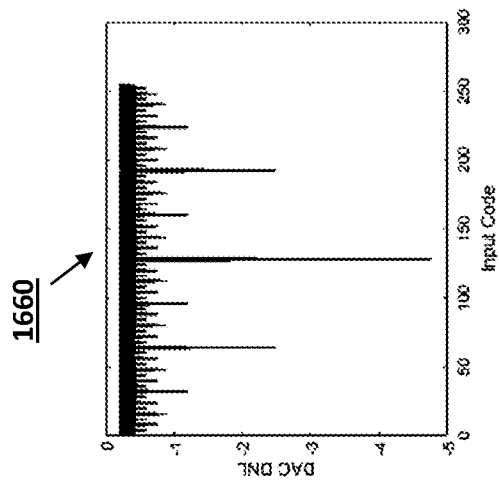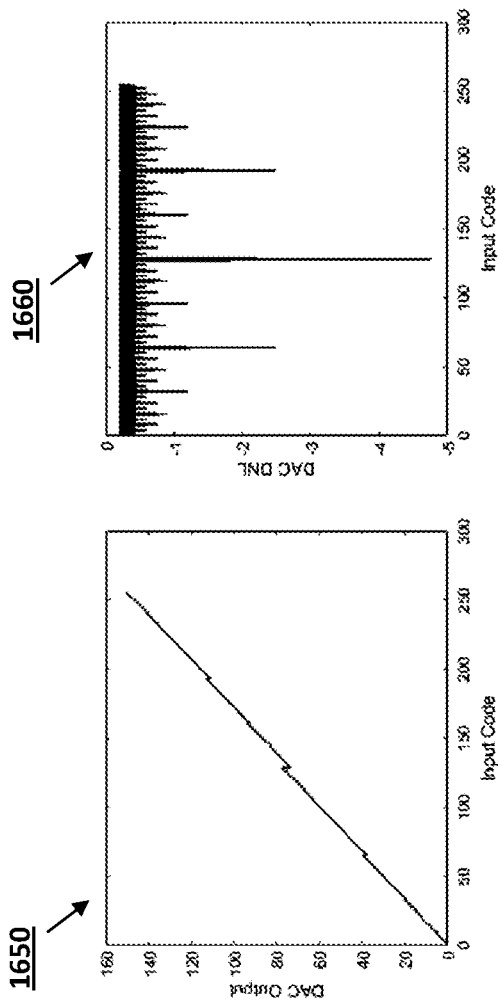
FIG. 16A
FIG. 16B
FIG. 16C

QUANTUM COMPUTING SYSTEMS, APPARATUS, AND METHODS

CROSS-REFERENCE TO RELATED APPLICATION

This patent application is a U.S. National Phase Application under 35 U.S.C. § 371 of International Application No. PCT/US2020/052944, filed Sep. 25, 2020, entitled QUANTUM COMPUTING SYSTEMS, APPARATUS, AND METHODS.

BACKGROUND

Field of the Invention

The embodiments of the invention relate generally to the field of quantum computing. More particularly, these embodiments relate to techniques for improving quantum computing accuracy and/or efficiency.

Description of the Related Art

Quantum computing refers to the field of research related to computation systems that use quantum mechanical phenomena to manipulate data. These quantum mechanical phenomena, such as superposition (in which a quantum variable can simultaneously exist in multiple different states) and entanglement (in which multiple quantum variables have related states irrespective of the distance between them in space or time), do not have analogs in the world of classical computing, and thus cannot be implemented with classical computing devices.

BRIEF DESCRIPTION OF THE DRAWINGS

A better understanding of the present invention can be obtained from the following detailed description in conjunction with the following drawings, in which:

FIGS. 1A-1F illustrate various views of an example quantum dot device, in accordance with one embodiment;

FIGS. 5A-B illustrate an example quantum circuit and program code to implement the quantum circuit;

FIG. 16A illustrates a trigger signal and associated rectangular pulse used to manipulate qubits;

FIG. 16B illustrates one embodiment of a digital-to-analog (DAC) converter which generates rectangular pulses in response to a lookup table (LUT);

FIG. 16C illustrates example mappings between input codes and DAC output values;

DETAILED DESCRIPTION

Figure 1A:
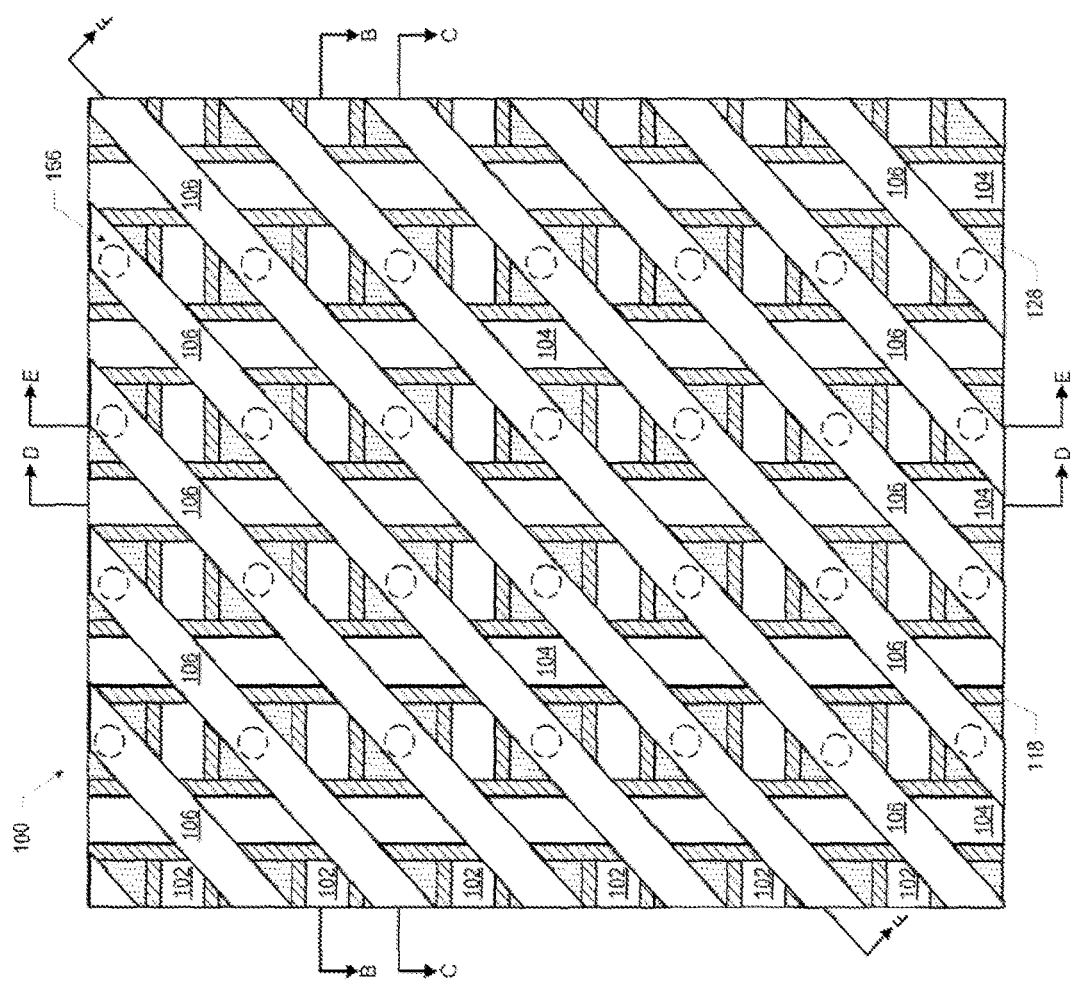

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Introduction

A quantum computer uses quantum-mechanical phenomena such as superposition and entanglement to perform computations. In contrast to digital computers which store data in one of two definite states (0 or 1), quantum computation uses quantum bits (qbits), which can be in superpositions of states. Qubits may be implemented using physically distinguishable quantum states of elementary particles such as electrons and photons. For example, the polarization of a photon may be used where the two states are vertical polarization and horizontal polarization. Similarly, the spin of an electron may have distinguishable states such as "up spin" and "down spin."

Qubit states are typically represented by the bracket notations |0> and |1>. In a traditional computer system, a bit is exclusively in one state or the other, i.e., a '0' or a '1.' However, qbits in quantum mechanical systems can be in a superposition of both states at the same time, a trait that is unique and fundamental to quantum computing.

Quantum computing systems execute algorithms containing quantum logic operations performed on qubits. The sequence of operations is statically compiled into a schedule and the qubits are addressed using an indexing scheme. This algorithm is then executed a sufficiently large number of times until the confidence interval of the computed answer is above a threshold (e.g., ~95+%). Hitting the threshold means that the desired algorithmic result has been reached.

Qubits have been implemented using a variety of different technologies which are capable of manipulating and reading quantum states. These include, but are not limited to quantum dot devices (spin based and spatial based), trapped-ion devices, superconducting quantum computers, optical lattices, nuclear magnetic resonance computers, solid-state NMR Kane quantum devices, electrons-on-helium quantum computers, cavity quantum electrodynamics (CQED) devices, molecular magnet computers, and fullerene-based ESR quantum computers, to name a few. Thus, while a quantum dot device is described below in relation to certain embodiments of the invention, the underlying principles of the invention may be employed in combination with any type of quantum computer including, but not limited to, those listed above. The particular physical implementation used for qbits is orthogonal to the embodiments of the invention described herein.

Quantum Dot Devices

Quantum dots are small semiconductor particles, typically a few nanometers in size. Because of this small size, quantum dots operate according to the rules of quantum mechanics, having optical and electronic properties which differ from macroscopic entities. Quantum dots are sometimes referred to as "artificial atoms" to connote the fact that a quantum dot is a single object with discrete, bound electronic states, as is the case with atoms or molecules.

Figure 1B:
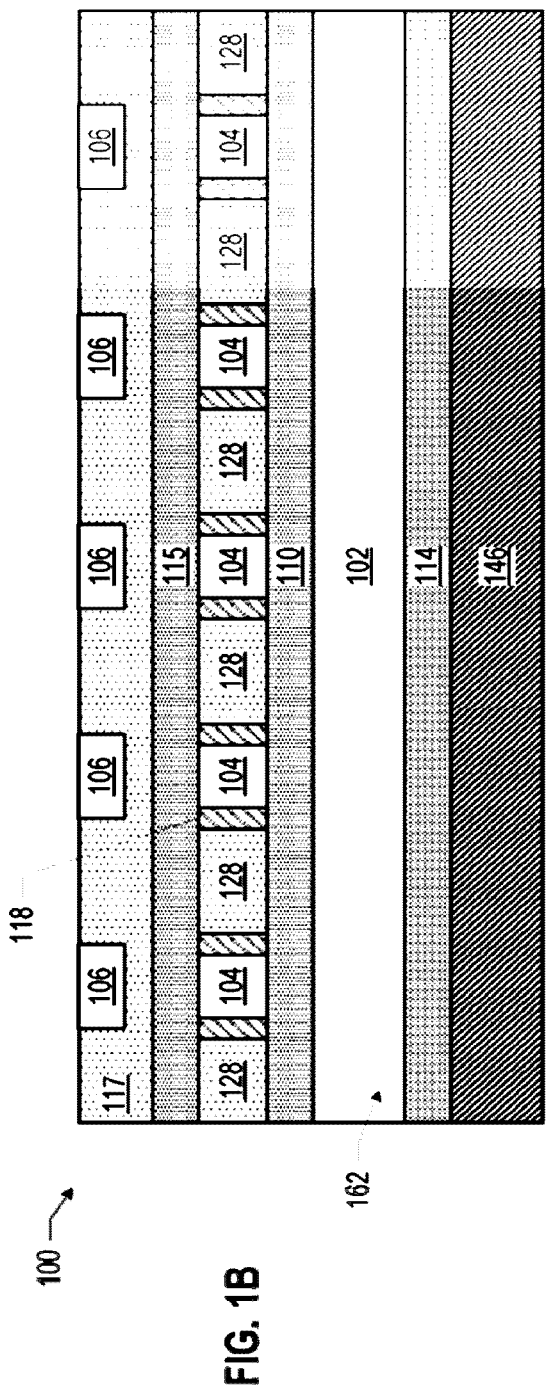
Figure 1C:
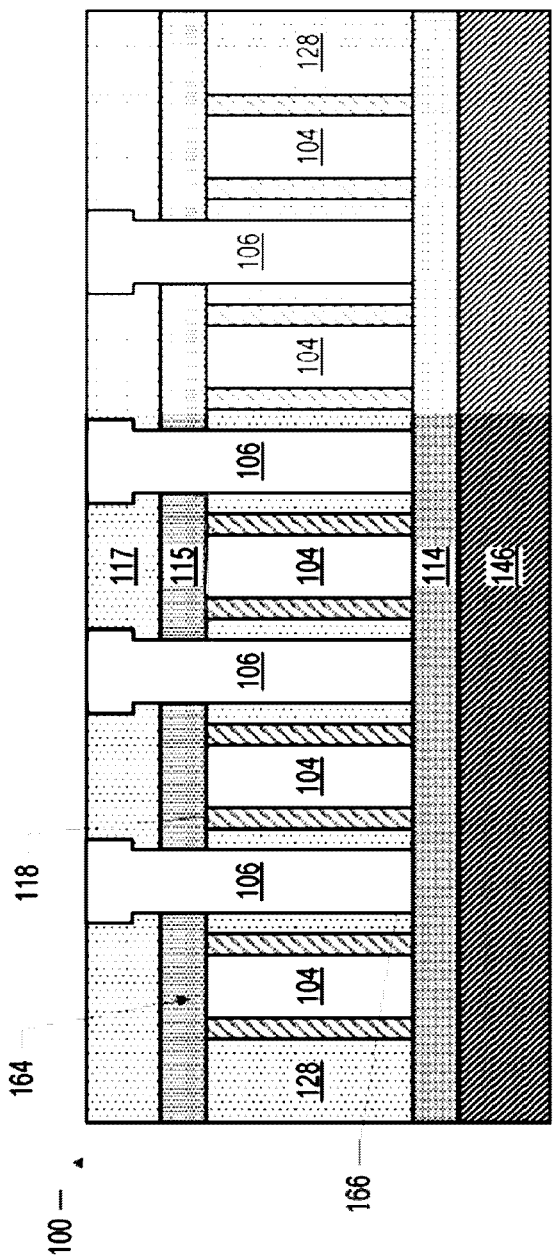
Figure 1D:
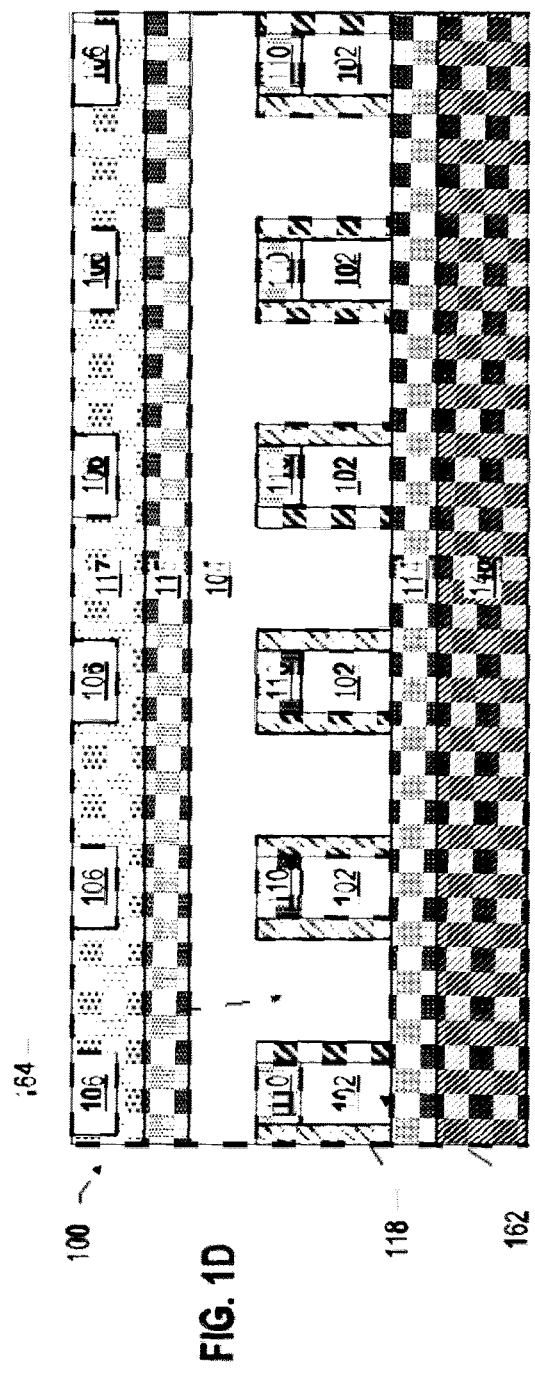
Figure 1E:
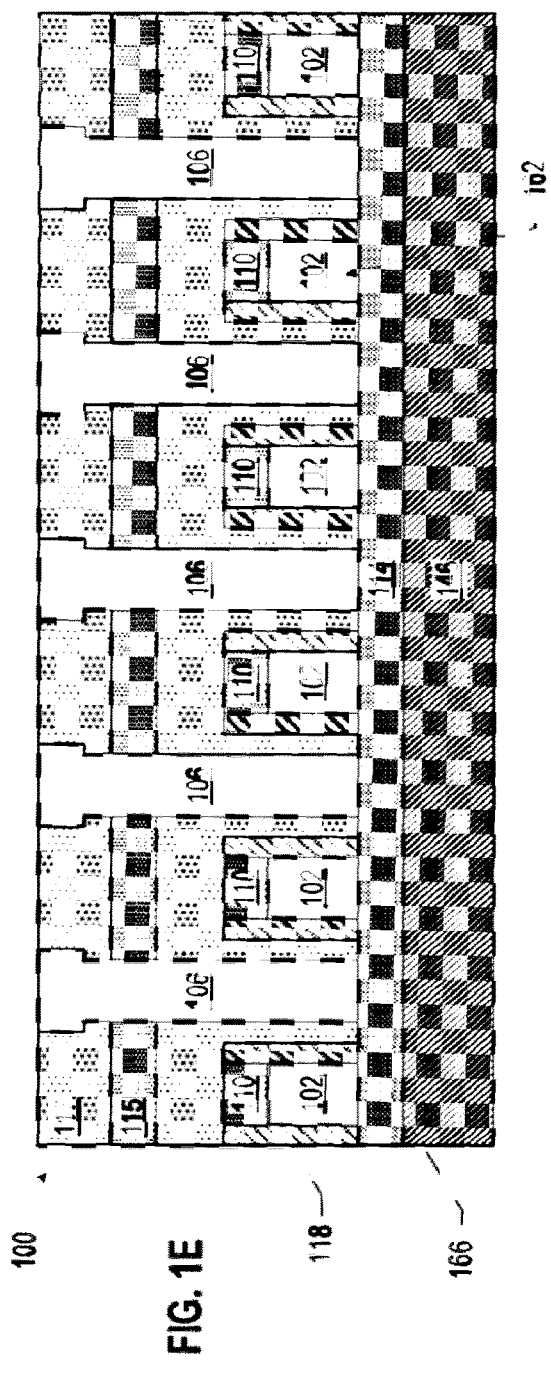

FIGS. 1A-1F are various views of a quantum dot device 100, which may be used with embodiments of the invention described below. FIG. 1A is a top view of a portion of the quantum dot device 100 with some of the materials removed so that the first gate lines 102, the second gate lines 104, and the third gate lines 106 are visible. Although many of the drawings and description herein may refer to a particular set of lines or gates as "barrier" or "quantum dot" lines or gates, respectively, this is simply for ease of discussion, and in other embodiments, the role of "barrier" and "quantum dot" lines and gates may be switched (e.g., barrier gates may instead act as quantum dot gates, and vice versa). FIGS. 1B-1F are side cross-sectional views of the quantum dot device 100 of FIG. 1A; in particular, FIG. 1B is a view through the section B-B of FIG. 1A, FIG. 1C is a view through the section C-C of FIG. 1A, FIG. 1D is a view through the section D-D of FIG. 1A, FIG. 1E is a view through the section E-E of FIG. 1A, and FIG. 1F is a view through the section F-F of FIG. 1A.

The quantum dot device 100 of FIG. 1 may be operated in any of a number of ways. For example, in some embodiments, electrical signals such as voltages, currents, radio frequency (RF), and/or microwave signals, may be provided to one or more first gate line 102, second gate line 104, and/or third gate line 106 to cause a quantum dot (e.g., an electron spin-based quantum dot or a hole spin-based quantum dot) to form in a quantum well stack 146 under a third gate 166 of a third gate line 106. Electrical signals provided to a third gate line 106 may control the electrical potential of a quantum well under the third gates 166 of that third gate line 106, while electrical signals provided to a first gate line 102 (and/or a second gate line 104) may control the potential energy barrier under the first gates 162 of that first gate line 102 (and/or the second gates 164 of that second gate line 104) between adjacent quantum wells. Quantum interactions between quantum dots in different quantum wells in the quantum well stack 146 (e.g., under different quantum dot gates) may be controlled in part by the potential energy barrier provided by the barrier potentials imposed between them (e.g., by intervening barrier gates).

Generally, the quantum dot devices 100 disclosed herein may further include a source of magnetic fields (not shown) that may be used to create an energy difference in the states of a quantum dot (e.g., the spin states of an electron spin-based quantum dot) that are normally degenerate, and the states of the quantum dots (e.g., the spin states) may be manipulated by applying electromagnetic energy to the gates lines to create quantum bits capable of computation. The source of magnetic fields may be one or more magnet lines, as discussed below. Thus, the quantum dot devices 100 disclosed herein may, through controlled application of electromagnetic energy, be able to manipulate the position, number, and quantum state (e.g., spin) of quantum dots in the quantum well stack 146.

In the quantum dot device 100 of FIG. 1, a gate dielectric 114 may be disposed on a quantum well stack 146. A quantum well stack 146 may include at least one quantum well layer 152 (not shown in FIG. 1) in which quantum dots may be localized during operation of the quantum dot device 100. The gate dielectric 114 may be any suitable material, such as a high-k material. Multiple parallel first gate lines 102 may be disposed on the gate dielectric 114, and spacer material 118 may be disposed on side faces of the first gate lines 102. In some embodiments, a patterned hardmask 110 may be disposed on the first gate lines 102 (with the pattern corresponding to the pattern of the first gate lines 102), and the spacer material 118 may extend up the sides of the hardmask 110, as shown. The first gate lines 102 may each be a first gate 162. Different ones of the first gate lines 102 may be electrically controlled in any desired combination (e.g., each first gate line 102 may be separately electrically controlled, or some or all the first gate lines 102 may be shorted together in one or more groups, as desired).

Multiple parallel second gate lines 104 may be disposed over and between the first gate lines 102. As illustrated in FIG. 1, the second gate lines 104 may be arranged perpendicular to the first gate lines 102. The second gate lines 104 may extend over the hardmask 110, and may include second gates 164 that extend down toward the quantum well stack 146 and contact the gate dielectric 114 between adjacent ones of the first gate lines 102, as illustrated in FIG. 1D. In some embodiments, the second gates 164 may fill the area between adjacent ones of the first gate lines 102/spacer material 118 structures; in other embodiments, an insulating material (not shown) may be present between the first gate lines 102/spacer material 118 structures and the proximate second gates 164. In some embodiments, spacer material 118 may be disposed on side faces of the second gate lines 104; in other embodiments, no spacer material 118 may be disposed on side faces of the second gate lines 104. In some embodiments, a hardmask 115 may be disposed above the second gate lines 104. Multiple ones of the second gates 164 of a second gate line 104 are electrically continuous (due to the shared conductive material of the second gate line 104 over the hardmask 110). Different ones of the second gate lines 104 may be electrically controlled in any desired combination (e.g., each second gate line 104 may be separately electrically controlled, or some or all the second gate lines 104 may be shorted together in one or more groups, as desired). Together, the first gate lines 102 and the second gate lines 104 may form a grid, as depicted in FIG. 1.

Multiple parallel third gate lines 106 may be disposed over and between the first gate lines 102 and the second gate lines 104. As illustrated in FIG. 1, the third gate lines 106 may be arranged diagonal to the first gate lines 102, and diagonal to the second gate lines 104. In particular, the third gate lines 106 may be arranged diagonally over the openings in the grid formed by the first gate lines 102 and the second gate lines 104. The third gate lines 106 may include third gates 166 that extend down to the gate dielectric 114 in the openings in the grid formed by the first gate lines 102 and the second gate lines 104; thus, each third gate 166 may be bordered by two different first gate lines 102 and two different second gate lines 104. In some embodiments, the third gates 166 may be bordered by insulating material 128; in other embodiments, the third gates 166 may fill the openings in the grid (e.g., contacting the spacer material 118 disposed on side faces of the adjacent first gate lines 102 and the second gate lines 104, not shown). Additional insulating material 117 may be disposed on and/or around the third gate lines 106. Multiple ones of the third gates 166 of a third gate line 106 are electrically continuous (due to the shared conductive material of the third gate line 106 over the first gate lines 102 and the second gate lines 104). Different ones of the third gate lines 106 may be electrically controlled in any desired combination (e.g., each third gate line 106 may be separately electrically controlled, or some or all the third gate lines 106 may be shorted together in one or more groups, as desired).

Although FIGS. 1A-F illustrate a particular number of first gate lines 102, second gate lines 104, and third gate lines 106, this is simply for illustrative purposes, and any number of first gate lines 102, second gate lines 104, and third gate lines 106 may be included in a quantum dot device 100. Other examples of arrangements of first gate lines 102, second gate lines 104, and third gate lines 106 are possible. Electrical interconnects (e.g., vias and conductive lines) may contact the first gate lines 102, second gate lines 104, and third gate lines 106 in any desired manner.

Not illustrated in FIG. 1 are accumulation regions that may be electrically coupled to the quantum well layer of the quantum well stack 146 (e.g., laterally proximate to the quantum well layer). The accumulation regions may be spaced apart from the gate lines by a thin layer of an intervening dielectric material. The accumulation regions may be regions in which carriers accumulate (e.g., due to doping, or due to the presence of large electrodes that pull carriers into the quantum well layer), and may serve as reservoirs of carriers that can be selectively drawn into the areas of the quantum well layer under the third gates 166 (e.g., by controlling the voltages on the quantum dot gates, the first gates 162, and the second gates 164) to form carrier-based quantum dots (e.g., electron or hole quantum dots, including a single charge carrier, multiple charge carriers, or no charge carriers). In other embodiments, a quantum dot device 100 may not include lateral accumulation regions, but may instead include doped layers within the quantum well stack 146. These doped layers may provide the carriers to the quantum well layer. Any combination of accumulation regions (e.g., doped or non-doped) or doped layers in a quantum well stack 146 may be used in any of the embodiments of the quantum dot devices 100 disclosed herein.

Apparatus and Method for a Hybrid Classical Quantum Computer

After Richard Feynman asked in 1982 whether quantum physics could be simulated efficiently using a quantum computer, much effort researching for a quantum computer has been focused on its universality and its efficiency over classical computation. One such example is David Deutsch's quantum Turing machine in 1985 that can be programmed to perform any computational task that can be performed by any physical object.

In contrast to theories and algorithms, quantum physical machines are in still their infancy. Efforts to build quantum information processing systems have resulted in modest success to date. Small quantum computers, capable of performing a small set of quantum operations on a very few qubits, represent the state of the art in quantum computation. In addition, quantum states are fragile in the sense that quantum states only remain coherent for a limited duration. This gap between algorithms and physical machines has driven the effort to invent hybrid classical-quantum algorithms. Some recent quantum algorithm developments have focused on short-depth quantum circuits to carry out quantum computations formed as subroutines embedded in a larger classical optimization loop, such as the variational eigensolver (P. J. J. O'Malley, 2016). Quantum languages, tools, and flows have been developed, providing software layers/stacks to translate and optimize applications to the quantum physical layer to cope with the stringent resource constraints in quantum computing (Frederic T. Chong, 2017, 14 Sep.).

On the hardware side, classical computers have been used to perform error correction for quantum computations. The "quantum co-processor" model is the most favorable prevailing execution model where a classical CPU controls a quantum processing unit in a similar manner to how CPUs in modern computer systems interact with GPUs. As described in (X.Fu, 2016, May) and (X. Fu, 2018), the microarchitecture for experimental superconducting quantum co-processors included features such as an arbiter on the code fetch data path to steer classical instruction to host CPU and quantum instruction to quantum co-processor, an exchange register file to synchronize register files between host CPU and the quantum co-processor, and a quantum instruction cache.

The microarchitectures for these mechanisms, however, are not well defined and explicit support for hybrid classical-quantum programs is lacking. Consequently, it is unclear how a quantum co-processor would be implemented within a quantum computer, particularly one which is required to run a diverse set of quantum programs. A flexible and programmable model has yet to be developed for executing hybrid classical-quantum algorithms.

One embodiment of the invention adds a set of quantum instructions to an instruction set architecture (ISA) of a processor such as a CPU. By way of example, these instructions may be included in an extension to the ISA (e.g., such as the AVX-512 extensions for the x86 platform). In addition, in one embodiment, a quantum engine is added to the processor's execution unit and the new quantum instructions are fetched, decoded, scheduled, and executed on the functional units of the quantum engine. In one embodiment, the quantum engine interacts with the classical execution engines using a shared register file and/or system memory. Upon executing the quantum instructions (or quantum crops in certain embodiments described herein), the quantum execution engine generates control signals to manipulate the state of the qubits within the quantum processor. The quantum engine also executes instructions to take a measurement of specified sets of qubits and store the results. In these embodiments, a quantum/classical interface provides connectivity between the quantum engine of the classical processor and the quantum processor.

Figure 2:
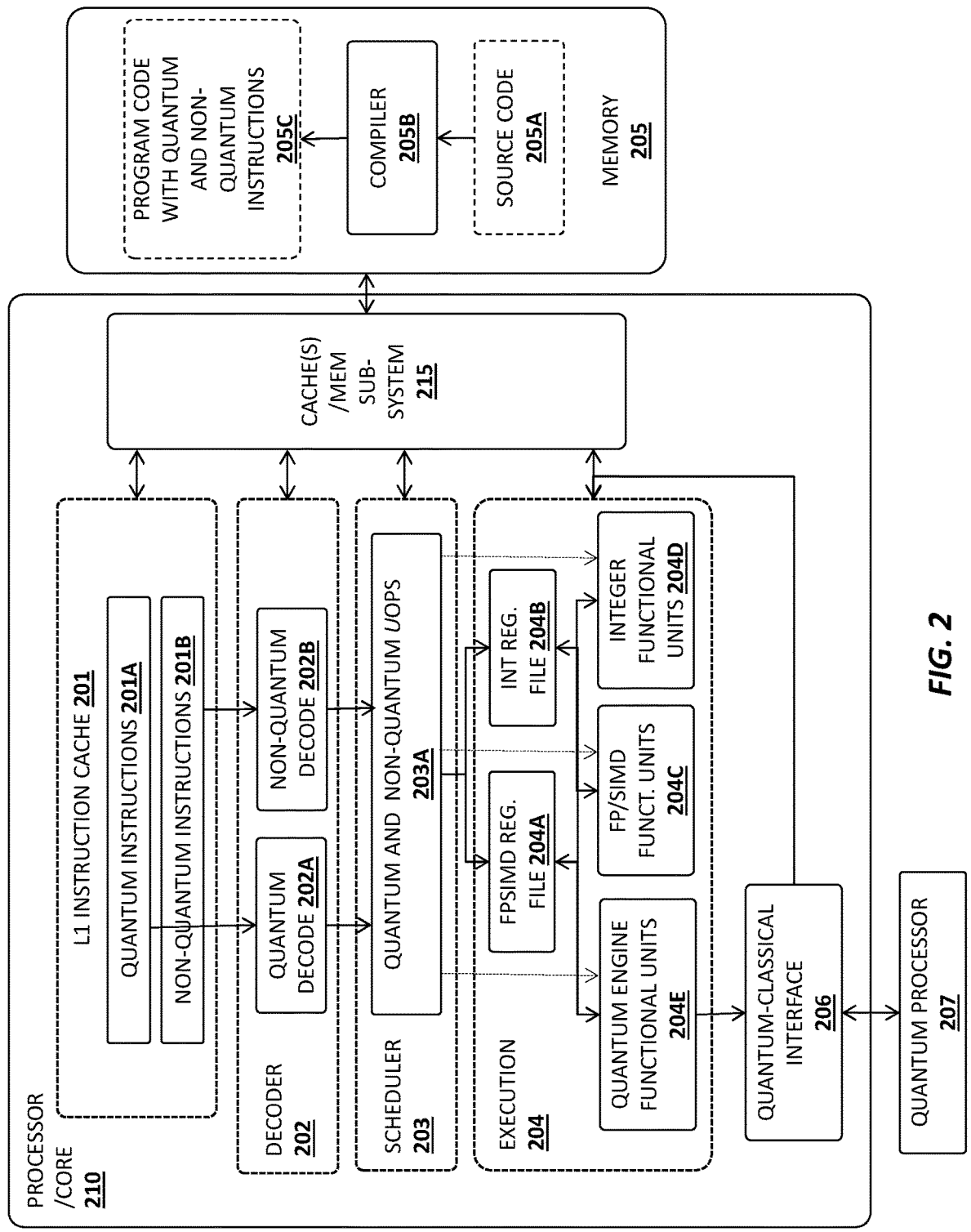
FIG. 2 illustrates one embodiment of a processor pipeline for processing quantum and non-quantum instructions.

FIG. 2 illustrates one embodiment of a processor or core 210 which fetches, decodes, and executes quantum instructions 201A and non-quantum instructions 201B, utilizing the same pipeline resources as the non-quantum instructions 201B. The processor/core 210 of this embodiment supports quantum extensions to an existing ISA of the processor/core 210 (e.g., extending the ISA to include the quantum instructions 201A). Program code 205C comprising the quantum and non-quantum instructions is generated by a compiler 205B from source code 205A written by a programmer (e.g., utilizing the extended ISA). Various source/program code examples are provided below.

Quantum and non-quantum instructions 201A-B are fetched from memory 205 at the front end of the instruction pipeline and stored in a Level 1 (L1) instruction cache 201. Instructions and data may also be stored within a Level 2 or Level 3 cache within a cache/memory subsystem 215, which manages memory requests and cache coherency.

A decoder 202 decodes the instructions 201A-B into micro-operations or uops 203A which are scheduled for execution by a scheduler 203 and executed by execution circuitry 204. In one embodiment, certain stages of the pipeline are enhanced to include hardware support for processing the quantum instructions 201B while other stages are unaltered. For example, quantum decode circuitry 202A may be added to the decoder 202 for decoding the quantum instructions 201A, just as non-quantum decode circuitry 202B decodes non-quantum instructions 201B. Although illustrated as separate components in FIG. 2 for the purpose of explanation, the quantum decode circuitry 202A and non-quantum decode circuitry 202B may comprise a common or overlapping set of circuitry and/or microcode. For example, in one embodiment, an existing decoder may be extended to include microcode support for quantum instructions (e.g., in microcode ROM) to generate new sets of quantum uops. The decoder 202 includes other decode circuitry such as a set of decode table structures (see, e.g., FIG. 3 and associated text), depending on the processor architecture.

In one embodiment, the decoder 202 generates a sequence of uops 203A in response to decoding the instructions 201A-B. In an implementation with quantum and non-quantum instructions, the uops may include a mixture of quantum uops and non-quantum uops, which are then scheduled for execution by an instruction scheduler 203.

The quantum and non-quantum uops 203A generated by the decoder 202 may initially be queued for execution within one or more uop queues of the scheduler 203, which dispatches the uops from the uop queue(s) in accordance with dependencies and/or execution resource availability. The embodiments of the invention may be implemented on various different types of processors with different types of schedulers. For example, in one embodiment, a set of execution "ports" couple the scheduler 203 to the execution circuitry 204, where each execution port is capable of issuing uops to a particular set of functional units 204C-E. In the example architecture shown in FIG. 2, for example, SIMD and floating point (FP) uops may be issued by the scheduler 203 over a FP/SIMD execution port coupled to a set of FP/SIMD functional units 204C and integer uops may be issued over an integer port coupled to a set of integer functional units 204D. While only two types of non-quantum functional units are shown for simplicity, the processor/core 210 may include various other/additional non-quantum functional units (e.g., such as load/store address generation units, branch units, additional SIMD and integer units, etc).

In the particular embodiment shown in FIG. 2, the quantum engine functional units 204E share the same set of register files 204A-B used by the legacy processor functional units 204C-D. In this particular example, the register files 204A-B include a FP/SIMD register file 204A which stores floating point and SIMD operands used by the FP/SIMD functional units 204C and an integer register file 204B which stores integer operands for the integer functional units 204D. In one implementation, the FP/SIMD register file 204A comprises 512 bit vector registers and the integer register file 204B comprises 64-bit scalar registers. Of course, different processor architectures will use different types of registers shared by the quantum engine functional units 204E. Various other types of registers may also be used such as a set of control/status registers and mask registers.

In an embodiment in which quantum uops are mixed with non-quantum uops, the quantum uops are issued over one or more quantum ports to a set of quantum engine functional units 204E, which execute the quantum uops to perform the underlying quantum operations. For example, the quantum engine functional units 204E, in response to the quantum uops, may generate control signals over a quantum-classical interface 206 to manipulate and take measurements of the qubits of a quantum processor 207.

The quantum-classical interface 206 includes digital-to-analog (D-A) circuitry to convert the digital quantum control signals generated by the quantum engine functional units 204E to analog signals required to control the quantum processor 207 (e.g., such as the codeword triggered pulse generation (CTPG) units and Arbitrary Waveform Generator (AWG) described below) and also includes analog-to-digital (A-D) circuitry to convert the physical qubit measurements to digital result data.

In one embodiment, the quantum-classical interface 206 is integrated on the same semiconductor chip as the other components of the instruction processing pipeline (e.g., the execution circuitry 204, scheduler 203, decoder 202, etc). As discussed in detail below, different types of circuit/logic components may be used depending on the particular physical implementation of the quantum processor 207.

Figure 3:
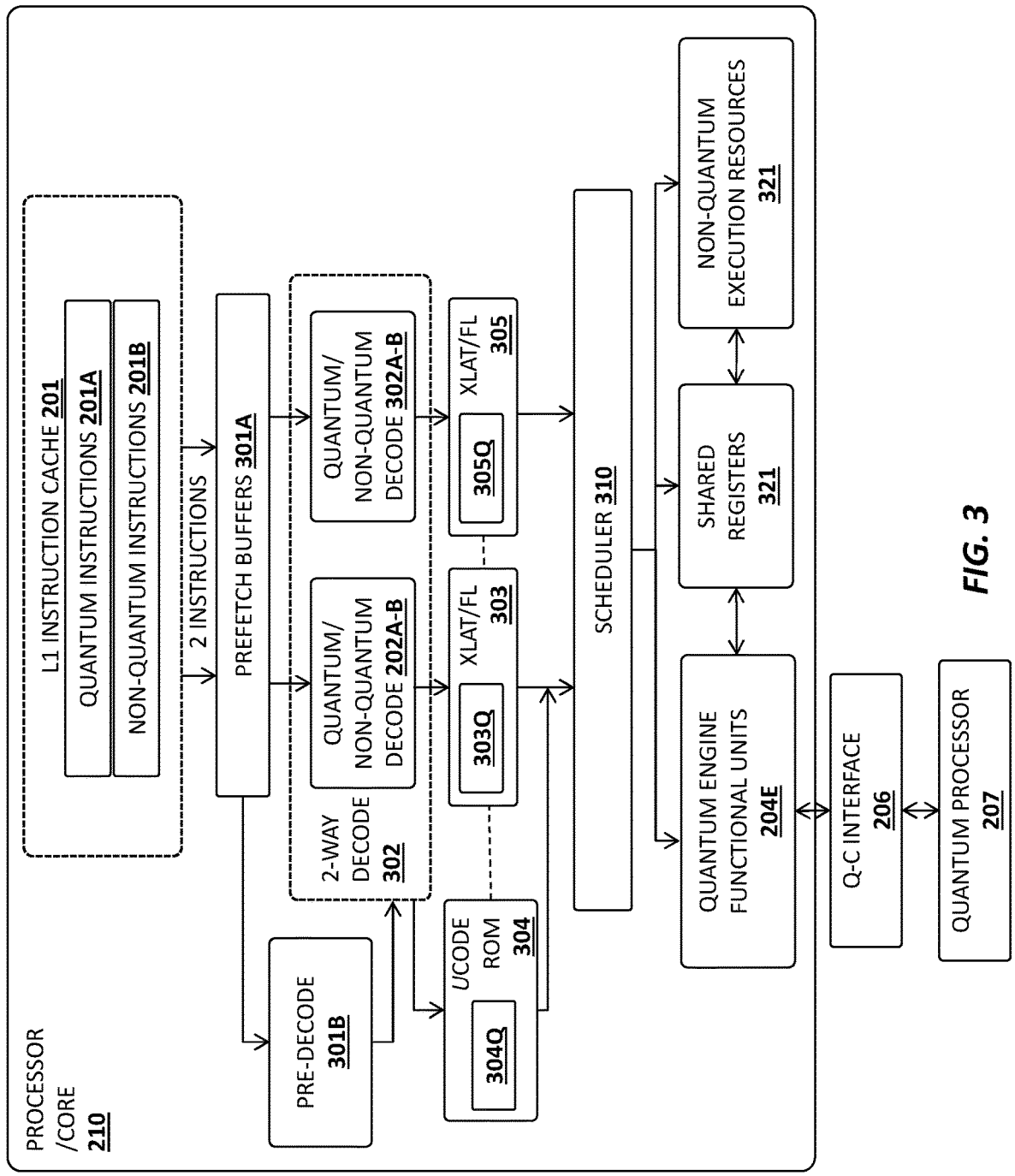
FIG. 3 illustrates an embodiment of front-end circuitry of a processor for processing quantum and non-quantum instructions.

FIG. 3 illustrates one embodiment in which quantum instruction processing support is added to a low power processing pipeline including a pre-decode buffer 301B, a 2-way decoder 302 with dual sets of quantum/non-quantum decoder circuitry 202A-B, 302A-B, dual lookup tables for instruction translation (XLAT), and a ucode ROM 304. In one embodiment, the XLAT components 303, 305 and ucode ROM 304 are extended to support the quantum instructions, as indicated by logic blocks 303Q-305Q. The pre-decode buffer 301B detects and marks macro-instruction boundaries prior to full decoding into uops by the 2-way decoder 302.

The operands for the quantum and non-quantum uops are stored in a set of shared registers 321 (as described above) and accessed by the quantum functional units 320 when executing the uops. The Q-C interface 320, in response to the quantum uops, controls the operation of the quantum processor 207.

Figure 4A:
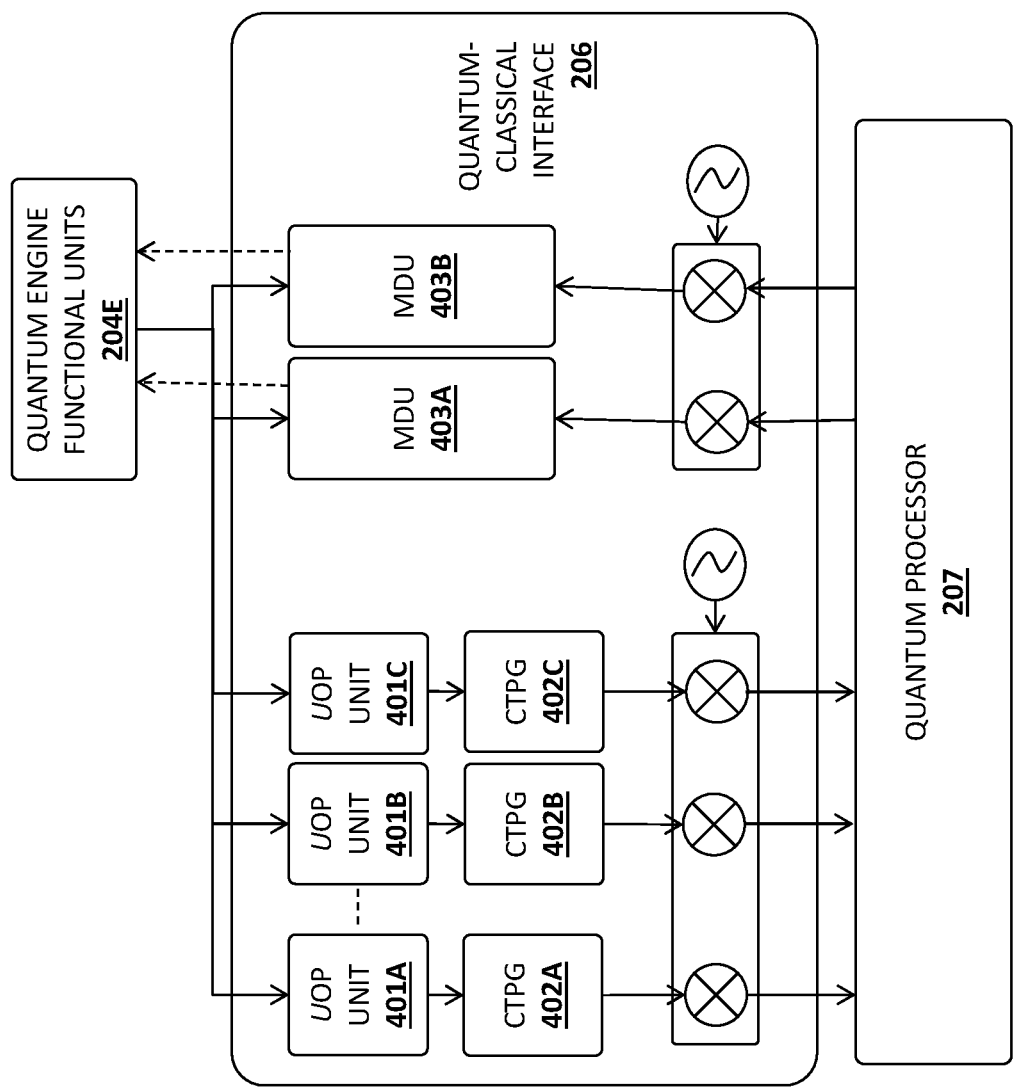
FIGS. 4A-B illustrate embodiments of a quantum-classical processor interface.
Figure 4B:
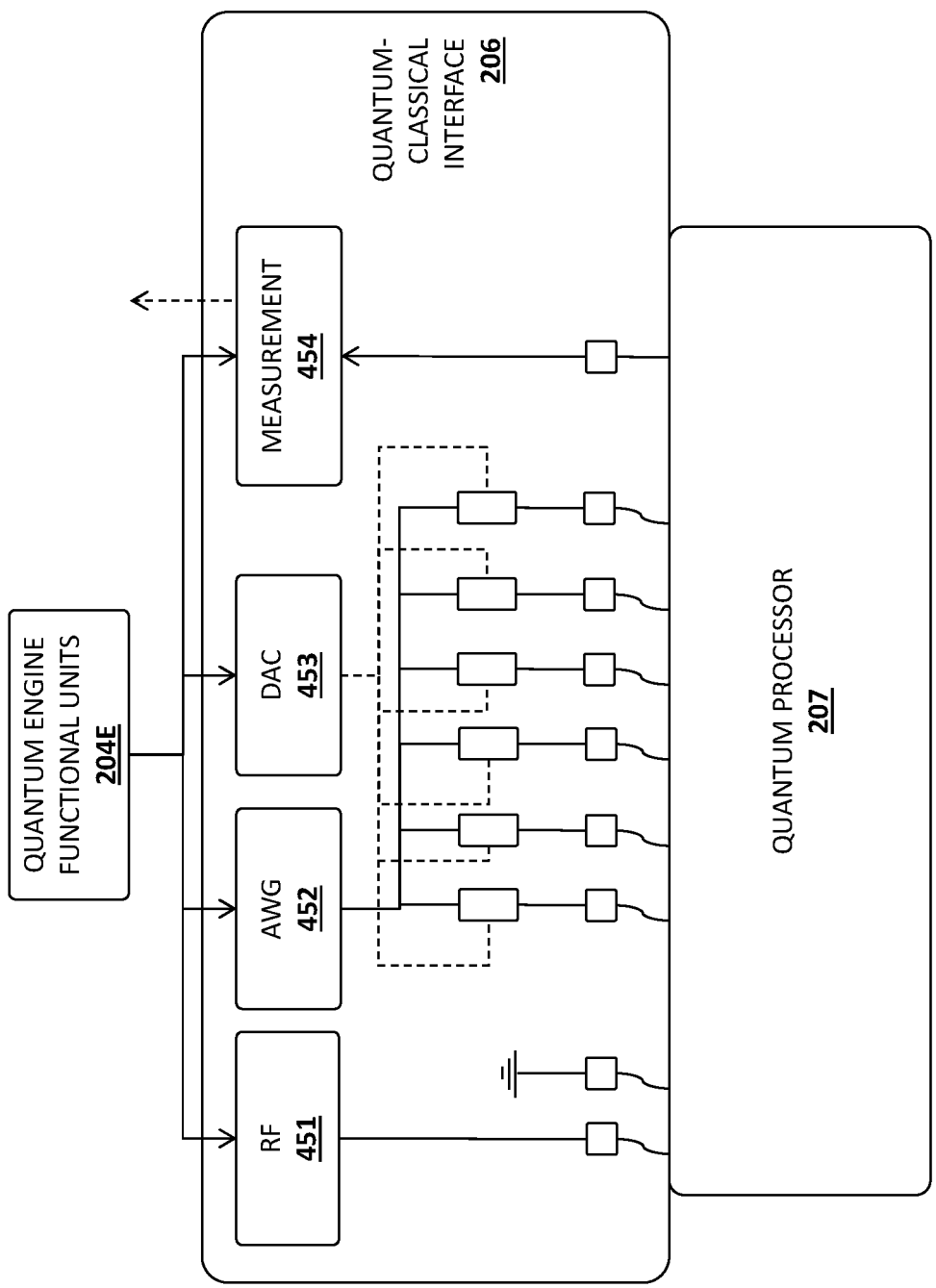

Different examples of a quantum-classical interface 206 are illustrated in FIGS. 4A-B. The Q-C interface 206 in FIG. 4A includes a plurality of uop units 401A-C which, responsive to the uops executed by the quantum engine functional units 204E, generate codewords to control operation of a plurality of codeword triggered pulse generation (CTPG) units 402A-C. In response, the CTPG units 402A-C generate sequences of pulses to control the qubits of the quantum processor 207. Once the quantum processor 207 has reached a specified execution state, quantum measurements are taken by one or more of the measurement discrimination units (MDUs) 403A-B.

The Q-C interface 206 shown in FIG. 4B includes a set of components to perform microwave complex signal generation including an RF microwave unit 451, multi-channel Arbitrary Waveform Generators (AWG) 452, one or more digital to analog converters (DACs) 453 and one or more measurement units 454. In one embodiment, the input to each of these components comprises a set of codewords generated by the quantum engine functional units 204E and the output is an analog waveform which manipulates the state of the qubits of the quantum processor 207. The measurement units 454 measure a current state associated with one or more qubits at a designated point in execution.

Figure 5A:
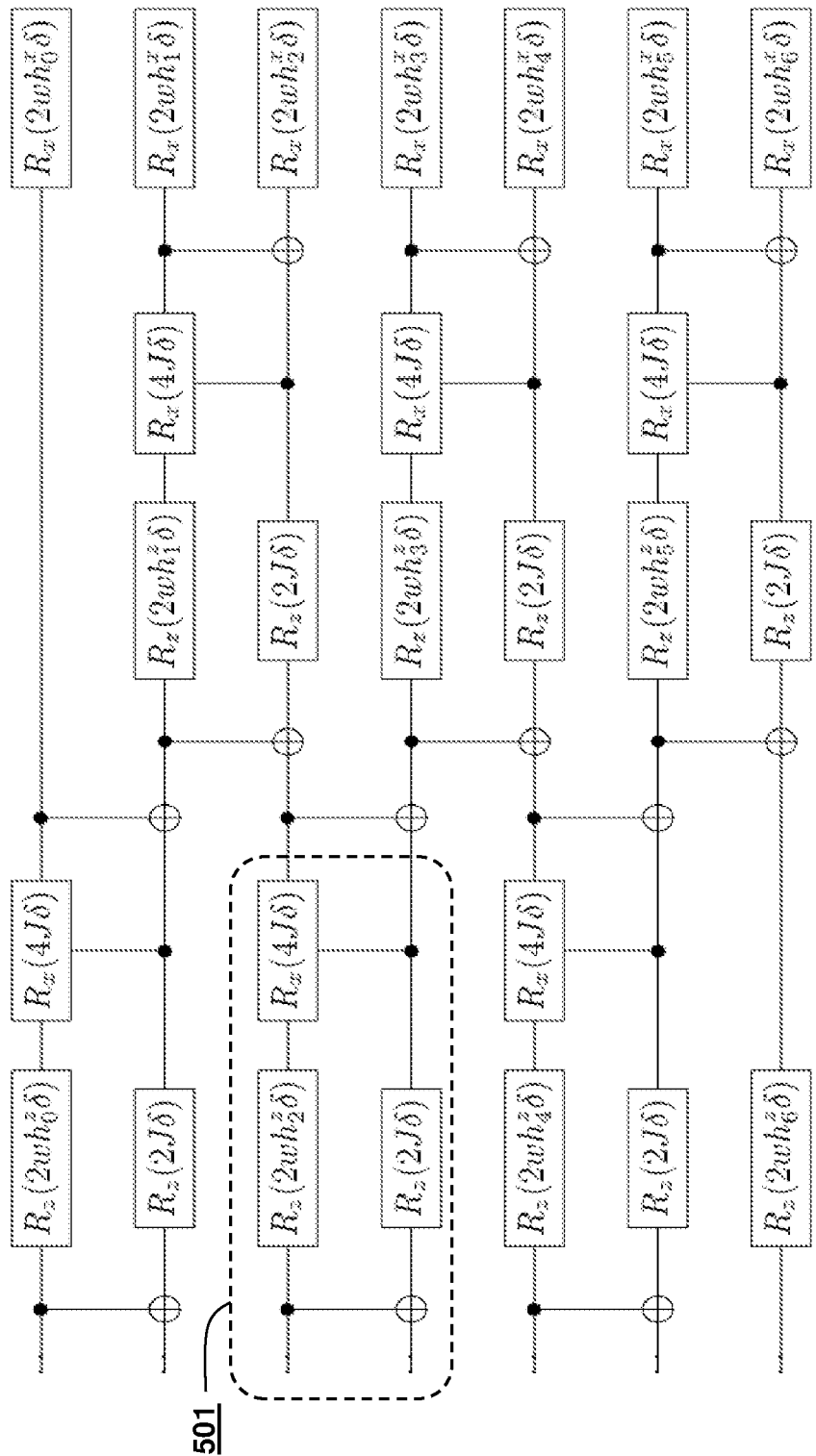

To further guide the analysis and discussion, a concrete example is illustrated in FIG. 5A, which shows a quantum circuit for a many-body disordered Hamiltonian to be time-evolved. Note that the angle through which $R_x$ and $R_y$ rotate are derived from several parameters. Particularly, $h_k^z$ and $h_k^x$ with $k \in \{0,1,\ldots,5,6\}$ are randomly generated and are used to emulate large many-body systems that require many more number of qubits than what the underlying quantum chip supports.

One example of a quantum program that uses this circuit for a portion of its computation is illustrated in FIG. 5B which includes a mixture of quantum instructions and non-quantum instructions (as indicated by the comments to the right of the source code). In this example, NR is the number of disorder realizations (i.e. multiple small random realizations to emulate a large many-body system), NQ is the number of Qubits, NP is the number of iterations in order to achieve the required precision on Probability (Pr), NT is the number of Trotter steps, and a[i] accumulates Qubit measurement. The probability of qubits being in state |0> or |1> is obtained by repeating measurements (NP) and averaging.

This program structure shows how classical operations and quantum operations may be tightly intertwined and executed on the classical-quantum processing architectures described herein. The most efficient way to execute this program is to process all instructions in a pipeline such as those described above, with the quantum engine functional units 204E for controlling qubits configured as execution engine peer to other classical execution engines 204A-B (such as integer, floating point, etc.).

Figure 6A:
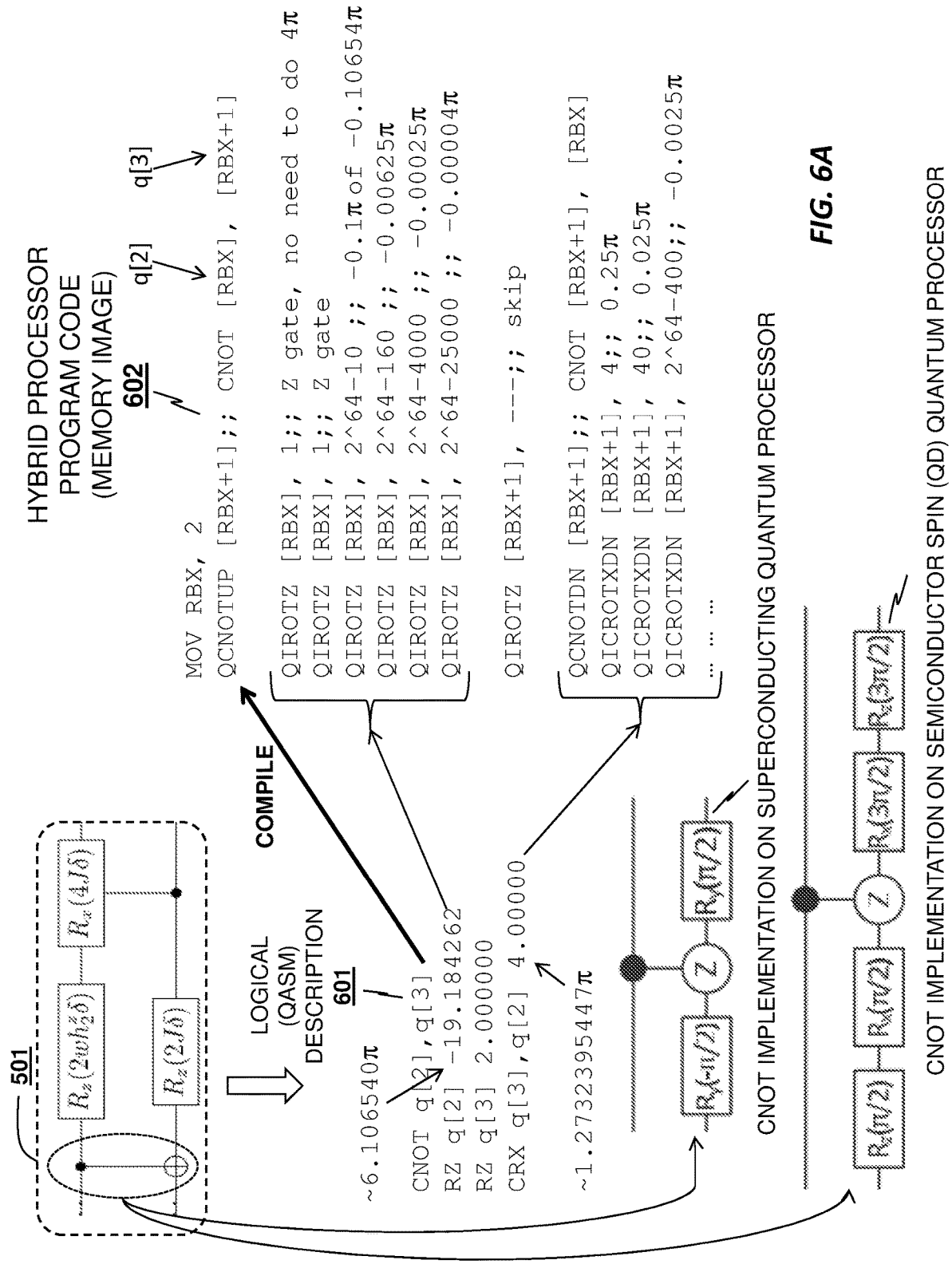
FIGS. 6A-B illustrate an example in which quantum instructions are generated by a compiler, decoded into uops, and executed within a quantum execution engine.
Figure 6B:
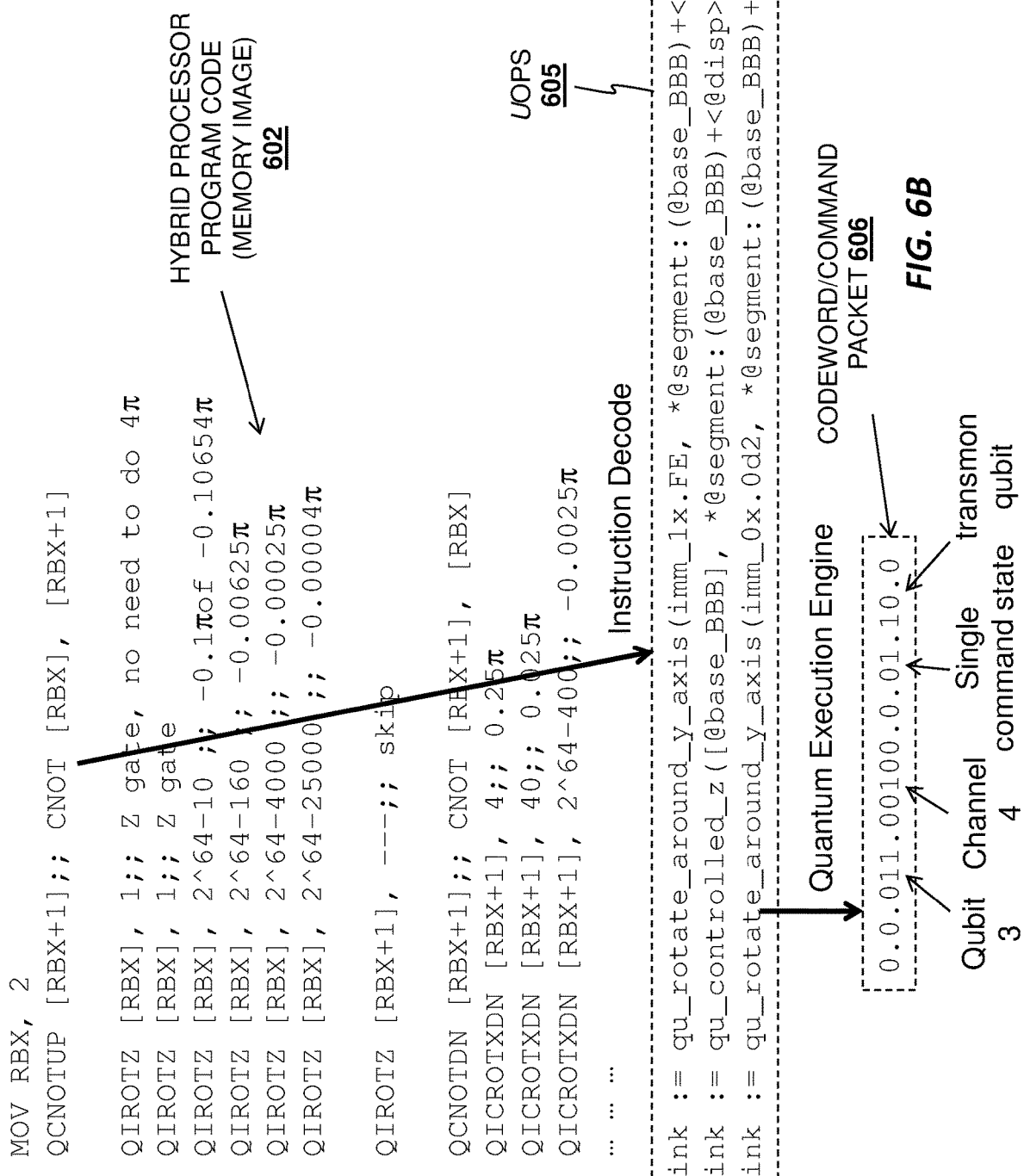

FIGS. 6A-B provide an example of the quantum operations performed in response to the program code in FIG. 5A. In particular, FIG. 6A illustrates a portion of quantum assembly language (QASM) code 601 to implement the highlighted portion 501 of the quantum circuit in FIG. 5A. The QASM code 601 is compiled into hybrid processor program code 602 in memory 205. In this example, the registers RBX and RBX+1 from the shared register file 321 or 204B are used to hold qubit indices to address logical qubits #2 and #3, respectively, in this particular example. The mapping of the relevant portions of the QASM code 601 to the hybrid processor program code 602 is indicated by arrows.

FIG. 6B illustrates how a quantum macroinstruction QCNOTUP (to implement a CNOT gate) is decoded into a series of uops 605 by the decoder 202. The uops 605 are executed by the quantum engine functional units 204E to generate codewords with a specified codeword or command packet format 606. In one particular format, a first data field indicates the qubit on which the operation is to be performed (qubit 3 in the example), a second data field indicates the channel over which the operation is to be transmitted (channel 4), a third field to indicate the command state (e.g., single command state), and a fourth data field to indicate the type of qubit (a transmon qubit). Of course, the underlying principles of the invention are not limited to any particular encoding format.

Figure 7:
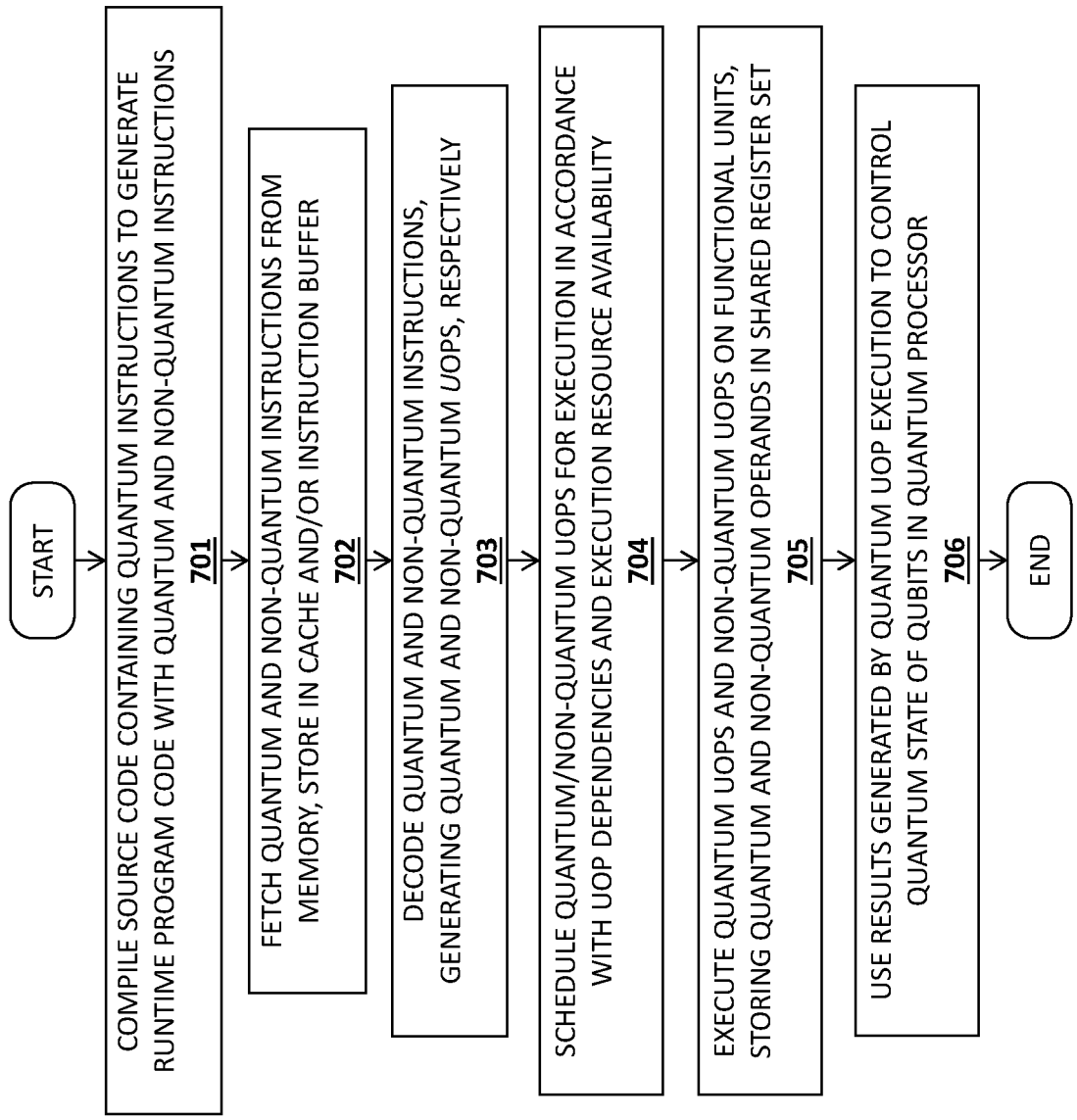
FIG. 7 illustrates a method in accordance with one embodiment of the invention.

A method in accordance with one embodiment of the invention is illustrated in FIG. 7. The method may be implemented within the context of the processor architectures described above but is not limited to any particular processor or system architecture.

At 701 source code containing quantum instructions is compiled to generate runtime program code with quantum and non-quantum instructions. At 702 the quantum/non-quantum instructions are fetched from memory and stored in a local cache (e.g., the L1 instruction cache) or instruction buffer. As mentioned, quantum instructions may be freely mixed with non-quantum instructions within the pipeline.

At 703 the quantum and non-quantum instructions are decoded into sets of quantum and non-quantum uops, respectively, and stored in a queue prior to execution. At 704 the quantum/non-quantum uops are scheduled for execution based on uop and/or resource dependencies. For example, if a first uop is dependent on the results of a second uop then the first uop may be scheduled for execution only when the data produced by the second uop is available in one of the registers. Similarly, if a particular functional unit is busy, then the scheduler may wait for an indication that the functional unit is available before scheduling a uop which requires that functional unit. Various other/additional scheduling techniques may be implemented (e.g., scheduling based on priority, register load, etc).

At 705 the quantum uops and non-quantum uops are executed on their respective functional units within the execution circuitry. As mentioned, the shared register set may be used to store the source and destination operands required by these uops.

At 706, the results generated by the execution of the quantum uops may be used as input to an interface unit to control the quantum state of the qubits in a quantum processor. In one embodiment, a series of codewords or command packets may be generated which identify a quantum channel, one or more qubits within a quantum processor, a qubit type and/or a command state. The specific physical operations performed in response to the codeword or command packet is based on the underlying type of quantum processor used.

The embodiments described herein integrates quantum instructions within an existing processor pipeline. Because of the tight integration, these embodiments significantly reduces the various overheads/bottlenecks associated with current co-processor designs. These overheads/bottlenecks include, for example, the communication between the classical computation layers/modules and the quantum computation layers/modules in the software stack and between the classical CPU and the quantum chip via the message queue. Given the relatively small size of quantum routines, the current GPU-like co-processor implementations are inefficient.

Due to increased classical processing capabilities, hybrid co-processor models reduce some of the overhead. In one particular implementation which supports the hybrid co-processor model, many new micro-architecture mechanisms were introduced. However, these micro-architectural mechanisms were ambiguously defined as was the boundary between the classical CPU and quantum co-processor.

In contrast, in the hybrid architecture described herein, the classical computation pipeline is equipped to fully support a defined set of quantum instructions which may be freely mixed with non-quantum instructions both at the front end of the pipeline (i.e., at the macroinstruction level) and within the back-end of the pipeline (e.g., where quantum uops are mixed with non-quantum uops) and executed on functional units within the execution circuitry of the processor.

Scalable Qubit Addressing Mode for Quantum Execution Engine and/or Co-Processor In quantum computing, a qubit is a unit of quantum information which is the quantum analogue of a classical binary bit. The computation is achieved by applying quantum gates, representing quantum logical operations, directly to qubits. Mathematically, this computing process is described as qubits undergo unitary transformations. Upon completion of computation, qubits are measured to gain information about the qubit states.

Therefore, to describe a quantum operation, it is necessary to identify the qubit or set of qubits to which the operation is applied. In a quantum program, each quantum instruction needs to encode both an operation to be performed and one or more qubits on which to perform the operation. In existing quantum instruction set architectures (e.g., QASM, Open QASM, QIS, etc) register operands are normally encoded in the opcode of an instruction. This scheme works for classical computing because the number of registers are very limited (e.g., 16, 32, 64, etc). However, this scheme is not scalable for quantum computing as quantum instructions will ultimately need to address a very large numbers of qubits. Consequently, encoding qubit addresses in the opcode field of quantum instructions would explode the instruction width.

As described above, in one embodiment, quantum instructions and non-quantum instructions are processed together within a shared processor pipeline. As such, the quantum instructions may rely on the same addressing modes as those available to the non-quantum instructions. The qubits in this embodiment are therefore addressed in a similar manner as non-quantum instructions which access system memory, providing a sufficiently large address space to accommodate a large number of qubits.

Figure 8:
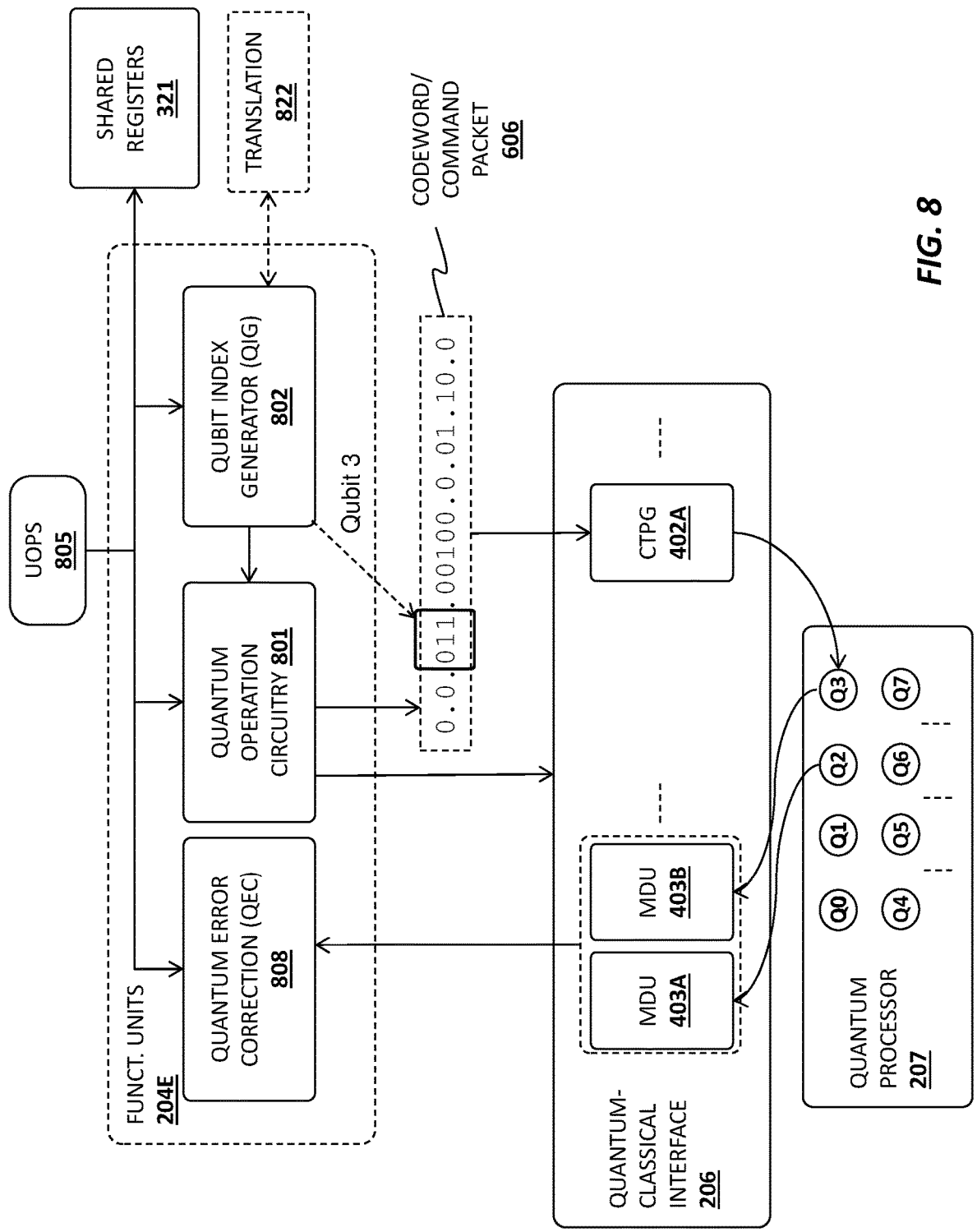
FIG. 8 illustrates one embodiment of a qubit index generator for addressing qubits within a quantum processor.

As illustrated in FIG. 8, in this embodiment, the quantum engine functional units 204E include a qubit index generation unit (QIG) 802 which determines a qubit index value or qubit ID in response to one or more uops 805. One or more quantum operation units 801 process the operations specified by the uops. The qubit index value (e.g., 011 for qubit 3 in the example) is then incorporated within the codeword/command packet 606, potentially along with one or more commands generated by the quantum operation unit 801 in response to processing the uops 805.

The QIG 802 may operate in accordance with different addressing modes supported by the processor. In one embodiment, the instruction identifies one of the shared registers 321 which contains the qubit index value (sometimes also referred to as a qubit ID). It may then use the qubit index value to identify the qubit within the codeword/command packet 606 and/or perform an operation using the qubit index value to generate one or more additional qubit index values. For example, it may add the qubit ID value to an integer specified by the uop to generate a second qubit ID.

The following examples demonstrate one way in which the QIG 802 generates qubit IDs in response to uops using an x86 assembly syntax. These operations may be performed within an x86 pipeline extended to support quantum instructions. However, the same general principles may be implemented on any processor architecture.

The single qubit instruction "QIROTX [RDI], 1" applies an X gate to the qubit number stored in RDI. Thus, if RDI contains 5, the X gate is applied to qubit number 5. In this example, the QIG 802 determines the qubit ID simply by reading the value stored in RDI (which is one of the shared registers 321 in this example). In this embodiment, the RDI value was stored previously by another uop. As another example, if the architecture register RBX contains a value of 2, then the two qubit instruction "QCNOTUP [RBX+3]," applies a CNOT operation with qubit 2 (q[2]) being the control qubit and qubit 5 (q[5]) being the target qubit. The QIG interprets the [RBX+3] notation as: the ID of the control qubit is stored in RBX and the ID of the control qubit+3 is the target qubit ID. Thus, the addressing scheme is extended so that two different qubits can be addressed with a single instruction, (i.e., CNOT). In contrast, in classical computing, only one memory location is addressed per instruction.

FIG. 8 also illustrates a codeword triggered pulse generator (CTPG) 402A which includes control logic and an analog-to-digital converter for interpreting the codeword/command packet 606 to identify one or more qubits (Q3 in the example) and generate a sequence of pulses to implement the specified quantum operations. When all of the quantum operations have been performed, as specified by the program code 205C, the quantum operation circuitry 801 and QIG 802 generates a codeword/command packet 606, causing one or more MDUs 403A-B to take a measurement of one or more qubits (as specified by the QIG 802 which generates the qubits indices). As mentioned, the MDUs include analog-to-digital circuitry to convert the analog measurements to digital values, which are then processed by a quantum error correction unit 808 to detect and potentially correct errors. If valid result data has been received it may be stored within one or more of the shared registers 321 and/or accumulated with prior measurement data. In addition to error correction, the measurement can also be used for program flow control based on measurement feedback.

The quantum error correction unit 808 may implement various techniques for detecting and correcting quantum errors. For example, in one embodiment, an error decoder (within the QEC unit 808) decodes a multi-qubit measurement from the quantum processor 207 to determine whether an error has occurred and, if so, implements corrective measures (is possible). The error measurements may be taken from multiple qubits in a manner which does not disturb the quantum information in the encoded state of the qubits (e.g., using ancilla qubits). In response, the QEC unit 808 generates error syndrome data from which it may identify the errors that have occurred and implement corrective operations. In one embodiment, the error syndrome data comprises a stabilizer code such as a surface code. In some cases, the response may simply be to reinitialize the qbits and start over. In other cases, however, modifications to the quantum algorithm implemented in the quantum program code 205C can be made to stabilize the region of the quantum processor responsible for the error (e.g., where compiler 205B includes a just-in-time (JIT) compiler). In either case, the CTPGs 402A perform the underlying physical operations under the control of the codewords/command packets 606 generated by the QEFU 204E. For example, the CTPG 402A may generate electromagnetic pulses to adjust the phase of one or more qbits in accordance with the detected phase error, or to reset the phase/spin of all qbits if re-initialization is required.

Addressing qubits in a manner which is similar to how classical CPU's address memory provides the scalability characteristics/attributes required for future quantum processor implementations. In particular, the above-described embodiments provide qubit indexing which is seamlessly integrated within an existing processor ISA and scales to a large number of qubit systems. These embodiments also remove pressure from the quantum instruction opcode space by way of a quantum extension to x86 or other architectures to address the qubit space and integrate quantum operations to existing processor pipelines.

Figure 9:
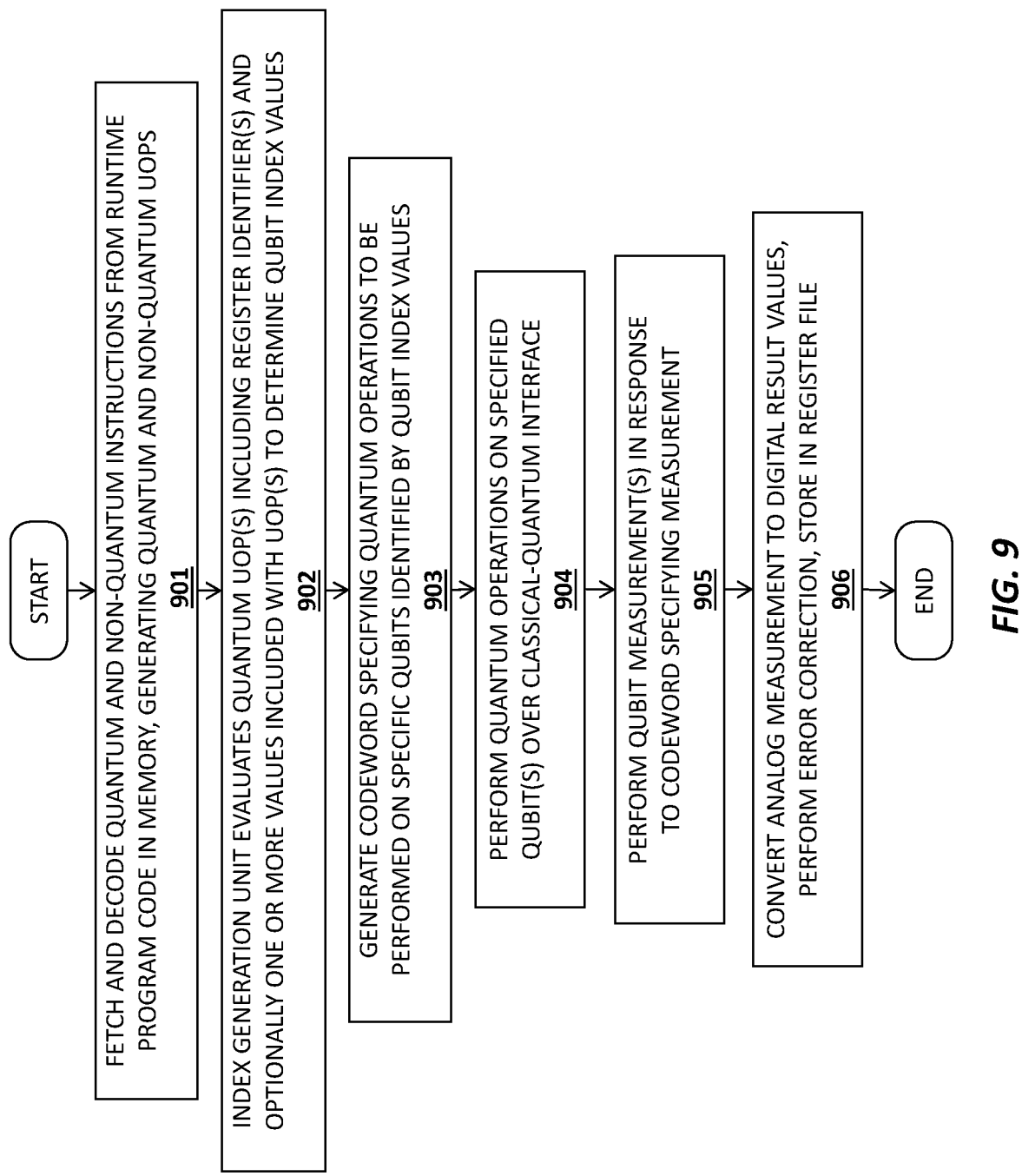
FIG. 9 illustrates a method for determining qubit index values for identifying qubits.

A method in accordance with one embodiment of the invention is illustrated in FIG. 9. The method may be implemented on the architectures described above but is not limited to any particular processor or system architecture.

At 901 quantum and non-quantum instructions from runtime program code are fetched and decoded, generating quantum and non-quantum uops. At 902 an index generation unit evaluates quantum uops including register identifiers and optionally one or more values included with the uops to determine qubit index values. As described above, the indices may be generated using a variety of techniques including reading qubit index values from registers identified by the uops and generating additional qubit index values using integer values included with the uops.

At 902, the quantum execution circuitry generates a codeword specifying the quantum operations to be performed on the qubits identified by the calculated qubit index values. At 905, qubit measurements are performed in response to another codeword generated based on additional uops. At 906, the analog measurement made on one or more of the qubits are converted to digital values. Error correction and/or flow control may then be performed based on the resulted digital result values stored in a register file of the processor.

Figure 10:
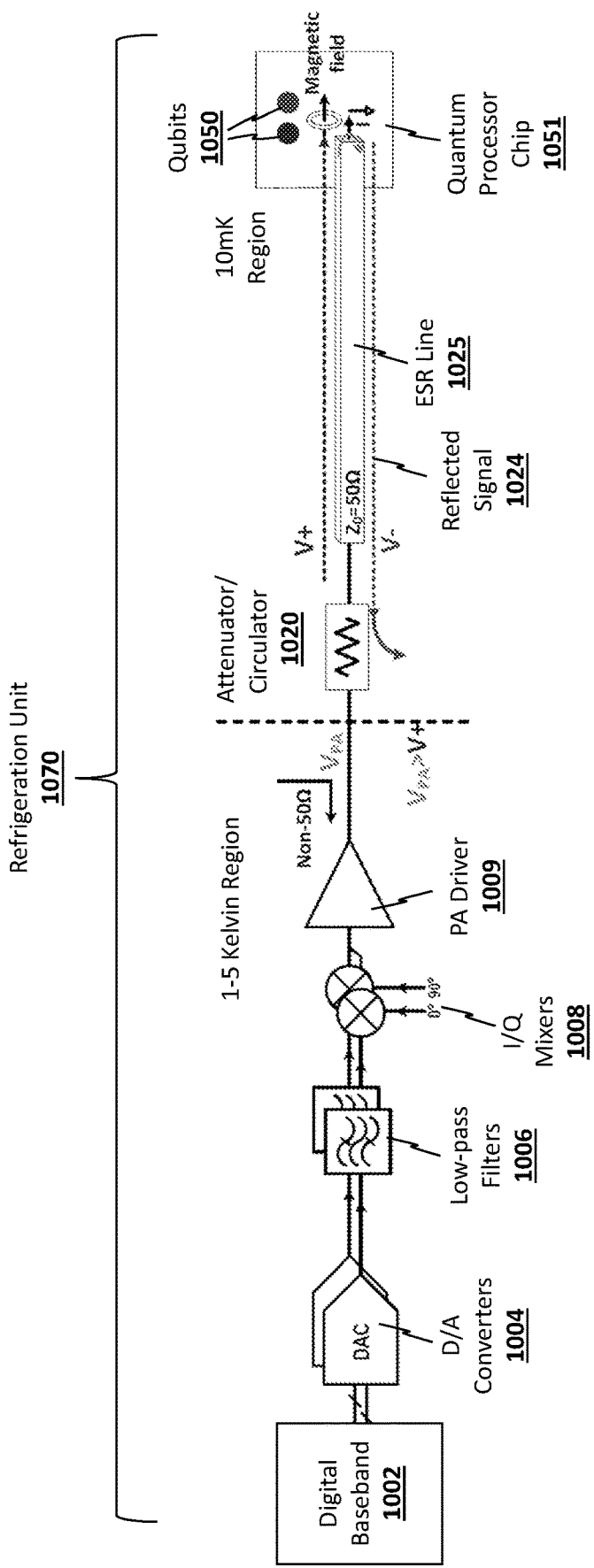
FIG. 10 illustrates one implementation of a qubit control chip coupled to a quantum processor chip.

Apparatus and Method to Interface an Integrated Qubit Control Chip and a Solid-State Qubit As previously described, solid-state quantum qubits such as superconducting qubits and spin qubits are manipulated by a sequence of microwave pulses. FIG. 10 illustrates an example arrangement in which a set of digital-to-analog (D/A) converters 1004 generate analog waveforms using a baseband signal from a digital baseband generator 1002. Low pass filters 1006 filter frequencies above a specified threshold (i.e., D/A images), and I/Q mixers 1008 perform a frequency up-conversion of the filtered analog baseband signal to a microwave frequency (via the in-phase (I) and quadrature (Q) components of the waveform). A power amplifier (PA) driver 1009 then amplifies the signal.

The microwave pulse is transmitted through an electron spin resonance (ESR) line 1025 which typically has a characteristic impedance of 50Ω. The pulse is delivered to a qubit 1050 on a quantum processor chip 1051 through cascaded attenuators 1020 along the refrigeration unit 1070. The cascaded attenuators 1020 are required to reduce the thermal noise and/or attenuate/terminate the reflected signal 1024 from the short-ended ESR line 1025. The ESR line 1025 is shorted to ground near the physical qubit 1050 to convert the microwave voltage pulse to a microwave current pulse, generating a magnetic field to manipulate the qubit 1050.

Conventionally, the mm-wave signal generation components used to generate the desired microwave pulses are located on the outside of the cooling apparatus 1070, which may be, for example, a dilution refrigerator, a helium-3 refrigerator, or a liquid helium refrigerator. These conventional components which power the control circuitry at room-temperature suffer from excessive signal loss and poor power efficiency due to the cascaded attenuators 1020 required along the fridge. Recently, a cryo-CMOS integrated qubit control chip located at 1-5 Kelvin plate in the refrigeration unit 1070 was used to locally generate a mm-wave microwave pulse. However, the power amplifier (PA) output in this implementation is not matched to 50Ω, resulting in undesired reflections. The attenuators/circulators 1020 are thus required in current implementations to attenuate/terminate the reflected signal from the short-terminated ESR line 1025 at the qubit chip 1051.

Figure 11A:
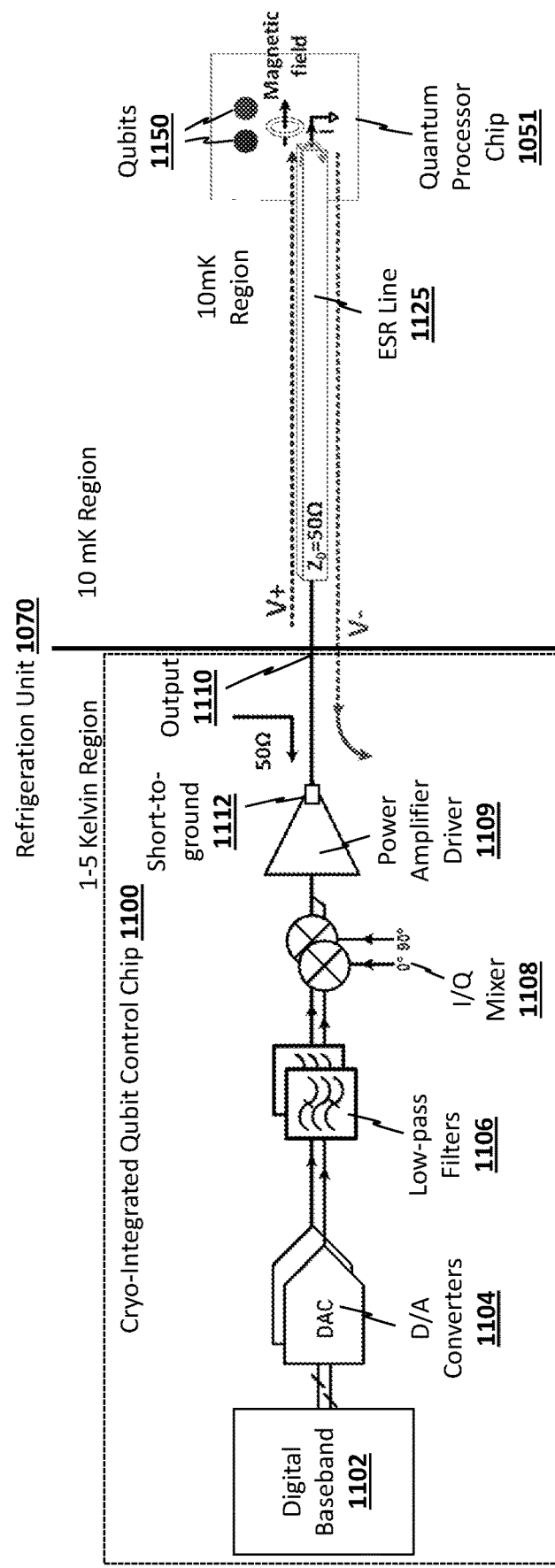
FIGS. 11A-B illustrate one embodiment of the invention for reducing noise in a quantum system by shorting the output of a power amplifier to ground when not in use.

Referring to FIGS. 11A, in one embodiment of the invention a cryo-integrated qubit control chip 1100 and a solid state qubit processor 1101 are directly connected without attenuators or circulators. The cryo-integrated qubit control chip 1100 is situated within the 1-5 Kelvin region of the refrigeration unit 1070 and includes a digital baseband unit 1102, D/A converters 1104, low-pass filters 1106, an I/Q mixer 1108, and a PA driver 1109. The output 1110 of the qubit control chip 1100, i.e., the PA driver output in the illustrated embodiment, is configured with an output impedance of 50Ω, so that the qubit control chip 1100 will absorb the reflected signal (V-) from the short-terminated ESR line 1125, obviating the need of an attenuator and/or circulator. Thus, this embodiment relies on the low thermal noise of the cryo-CMOS qubit control chip 1100 operating at cryogenic temperatures and directly connects the chip output 1110 to the ESR line 1125 without the need for thermal noise reduction.

Given the defined chip output impedance of 50Ω, the magnitude of the current flowing into the ground at the short-ended ESR line 1125 can be precisely controlled. In particular, because I=V/50, the open-circuit voltage (V) at the PA output 1110 can be precisely adjusted to control the current (I) regardless of the length of the ESR line 1125 (which is a 50Ω coaxial cable in some embodiments). The current produced from the cryo-integrated qubit control chip 1100 controls the strength of the generated magnetic field applied to the qubits 1150 and therefore the speed of qubit rotation.

The above-described interface between the qubit control chip 1100 and quantum processor 1101 offers several advantages over conventional schemes. With the direct connection, the required maximum signal power or voltage swing at the chip output 1110 is substantially reduced, which relaxes the linearity requirement of the power amplifier 1109, resulting in improved power efficiency. Furthermore, with the defined chip output impedance of 50Ω, the magnitude of the current flowing into the ground at the short-terminated ESR line 1125 can be precisely controlled, thereby precisely controlling the magnetic field strength and qubit rotation speed as described above.

As shown in FIG. 11A, in one embodiment of the invention, the output of the PA driver 1109 includes a built-in short-to-ground switch 1112 to reduce the noise propagation to the qubit 1150 when microwave pulse generation is not used (e.g., between microwave pulses), thereby improving qubit-state readout fidelity. The switch 1112 may be integral to the PA driver 1109 or may be coupled to the output of the PA driver 1109. With the switch 1112 in a first configuration, current from the power amplifier driver 1109 is passed through the ESR line 1125 to the qubits 1150. In a second configuration, the output is shorted to ground (as described in greater detail below).

Figure 11B:
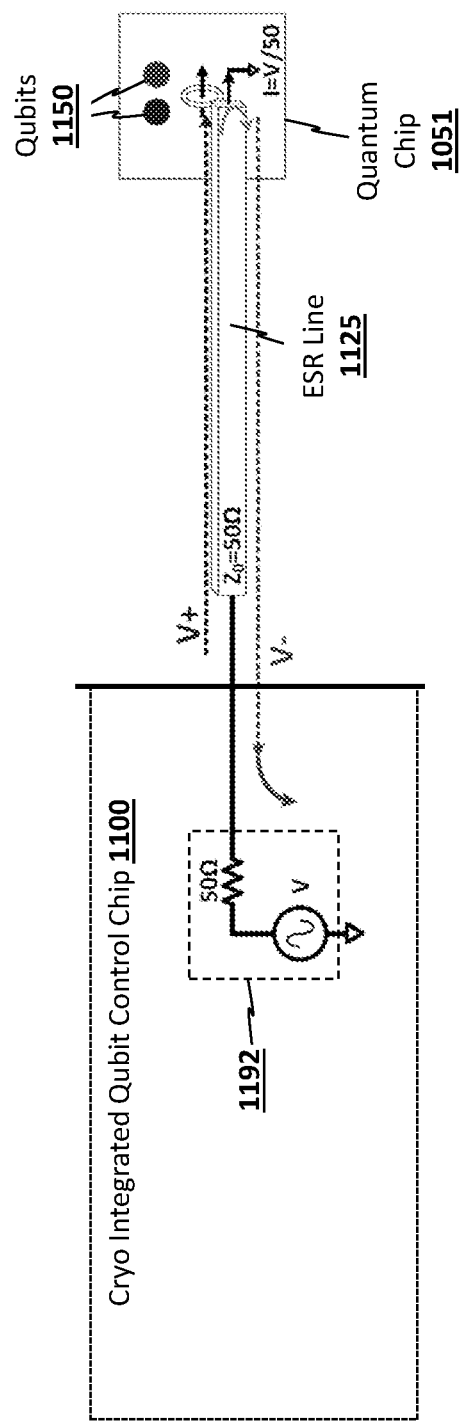

FIG. 11B shows a simplified PA behavior model representing a variety of different implementations. As shown in the circuit representation 1192, the PA behaves as voltage source with an open signal voltage of "V" and source impedance of 50 ohm. Together with an arbitrary length of coaxial cable with the characteristic impedance of 50 ohm, the current at the qubit 1150 within the quantum chip 1051 will be precisely controlled by the equation I=V/50.

Figure 12:
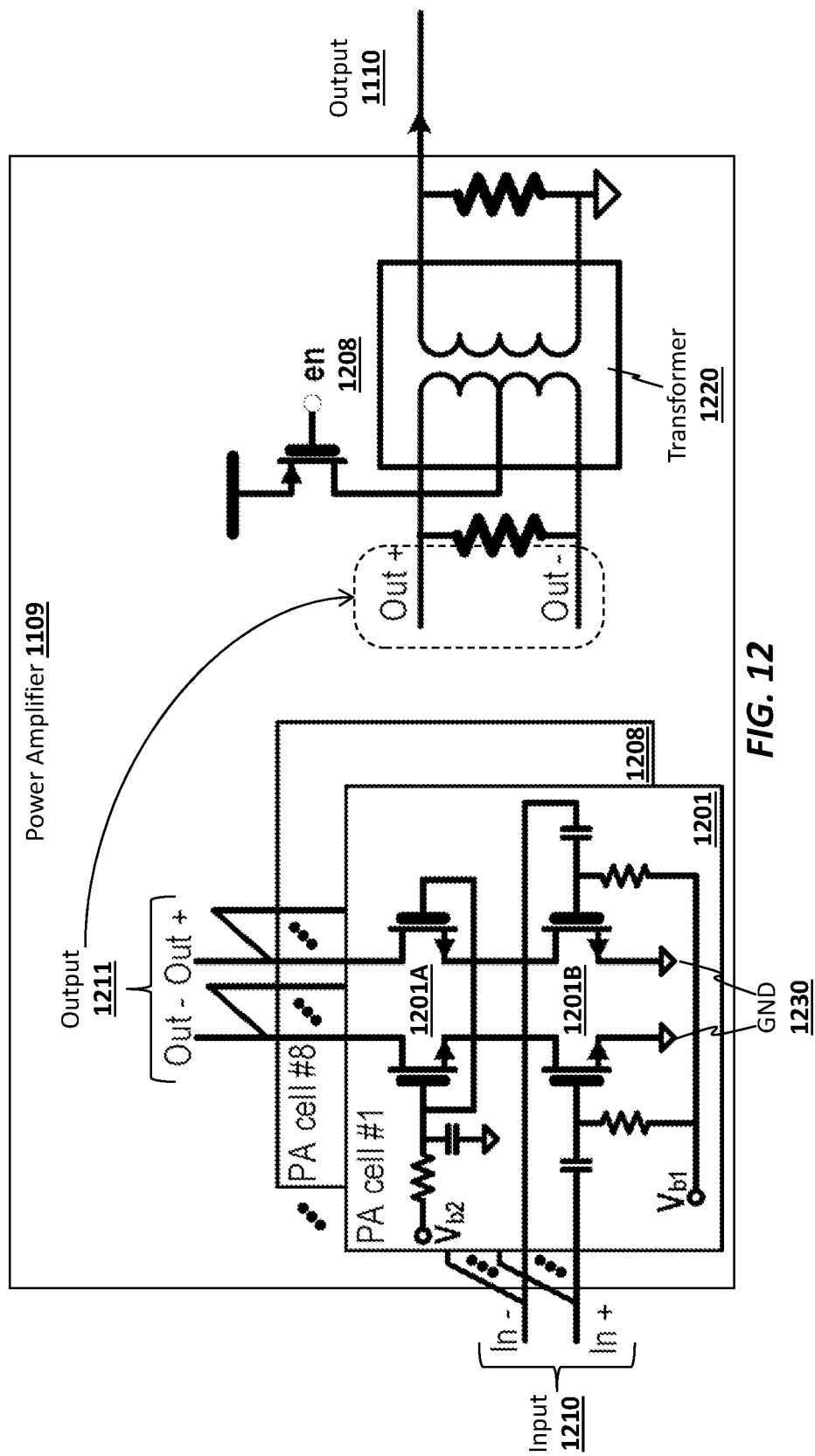
FIG. 12 illustrates one embodiment of a power amplifier circuit for shorting signals to ground.

FIG. 12 illustrates one particular implementation of the switch 1112 shown in FIG. 11A. Note, however, that the underlying principles of the invention are not limited to this particular implementation. The power amplifier includes binary/thermometer-weighted power amplifier (PA) cells 1201, 1208 (only two of which are shown for simplicity) and each PA cell 1201, 1208 contains a differential cascode amplifier. The same input signal (e.g., from the output of the I/Q mixers 1108 in FIG. 11A) is applied in parallel across the PA cells 1201, 1208 each of which generates an output signal. The individual output signals are combined to produce output signal 1211. The DC current of the combined output 1211 from the PA cells 1201, 1208 is provided through the center tap of an output transformer 1220.

In one embodiment, when the power amplifier 1109 is in the on-state, the cascode transistors 1201B as well as common source transistors 1201A are properly biased and the input microwave pulse is amplified at the output 1211, which is then provided through the transformer 1220 to generate the final PA output 1110 if the transformer 1220 is enabled via signal 1208.

In one embodiment, during the qubit-state readout, the power amplifier 1109 is turned off and the PA output is shorted to analog ground to reduce the noise propagation to the qubit chip. In the embodiment described above, this short-to-ground function is integral to the digital power cell topology, without the need for additional switches. During the qubit-state readout, the cascode transistors 1201B as well as common-source transistors 1201A are pulled up, shorting the output node 1211 to analog ground 1230 while the center tap switches are completely disabled via enable signal 1208 to avoid DC short-circuit current.

The embodiments described above in FIGS. 11A-B may be used in combination with various other embodiments described herein. By way of example, and not limitation, the bin counters described with respect to FIG. 14 and the lookup table and digital-to-analog converter in FIG. 16B may be used in combination with the cryo-integrated qubit control chip 1100 illustrated in FIGS. 11A-B.

Apparatus and Method for Detecting Qubit State with Transition Pulse Histogram

One embodiment of the invention includes a method and apparatus for low-power collection and management of reflectometry data within a quantum processing system. In one implementation, a histogram of incoming samples is built with bin counters as the reflectometry data arrives. Using bin counters instead of storing the entire waveform in a memory or other storage device allows for a very low power implementation which is suitable for a reflectometry detector within the 4K region of the refrigeration unit.

Figure 13A:
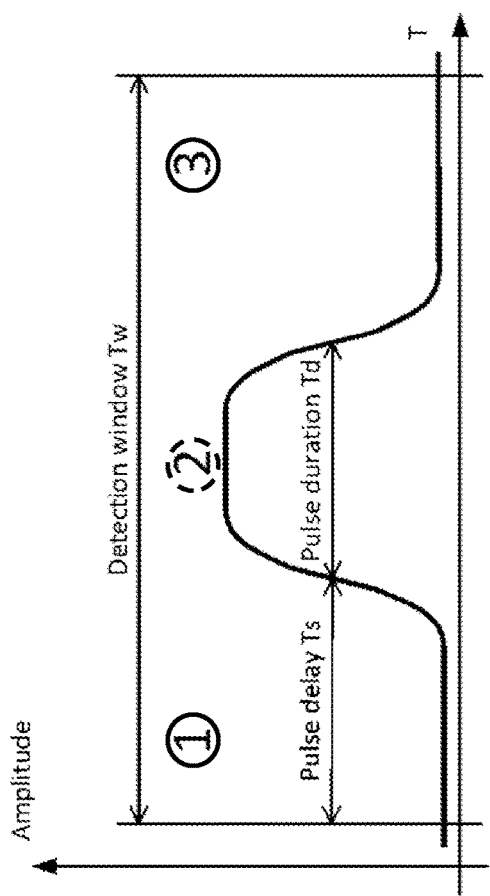
FIG. 13A illustrates an example microwave pulse of a specified duration within a detection window.

In a reflectometry detector, a state-dependent change of a quantum bit cell resistance is used to determine the qubit state. This is accomplished by observing reflections of a pilot radio frequency (RF) signal. In a baseline/basic state, the qubit resistance is tuned to perfectly terminate the transmission line, resulting in no significant reflected signal as shown in Region 1 of the detection window Tw in FIG. 13A, representing the pulse delay Ts. When the qubit is switched to an exited state (e.g., caused by microwave pulses from a stimulus generator), the quantum bit cell resistance changes, resulting in reflections of the pilot RF signal as indicated in Region 2, representing the pulse duration Td. In particular, after the pulse delay time Ts, the qubit state changes, causing the reflected signal amplitude to rise sharply. After the pulse, the qubit returns into its basic state again, causing reflections to drop to zero in Region 3. The values of both Ts and Td are defined by the properties of the qubit and have some distributions which make exact transition times unpredictable. The overall detection window, Tw, should be long enough to encompass both distributions.

Figure 13B:
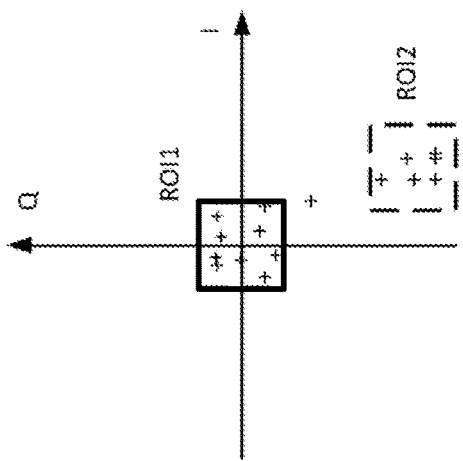
FIG. 13B illustrates a plot of in-phase (I) and quadrature (Q) values of detected signals, arranged in different regions of interest.

An example set of in-phase (I) and quadrature (Q) measurements are illustrated in FIG. 13B. The first region of interest (ROI1) corresponds to the measurements in which the qubit was in the basic state while the second region of interest (ROI2) comprise measurements when the qubit was in the excited state.

Figure 14:
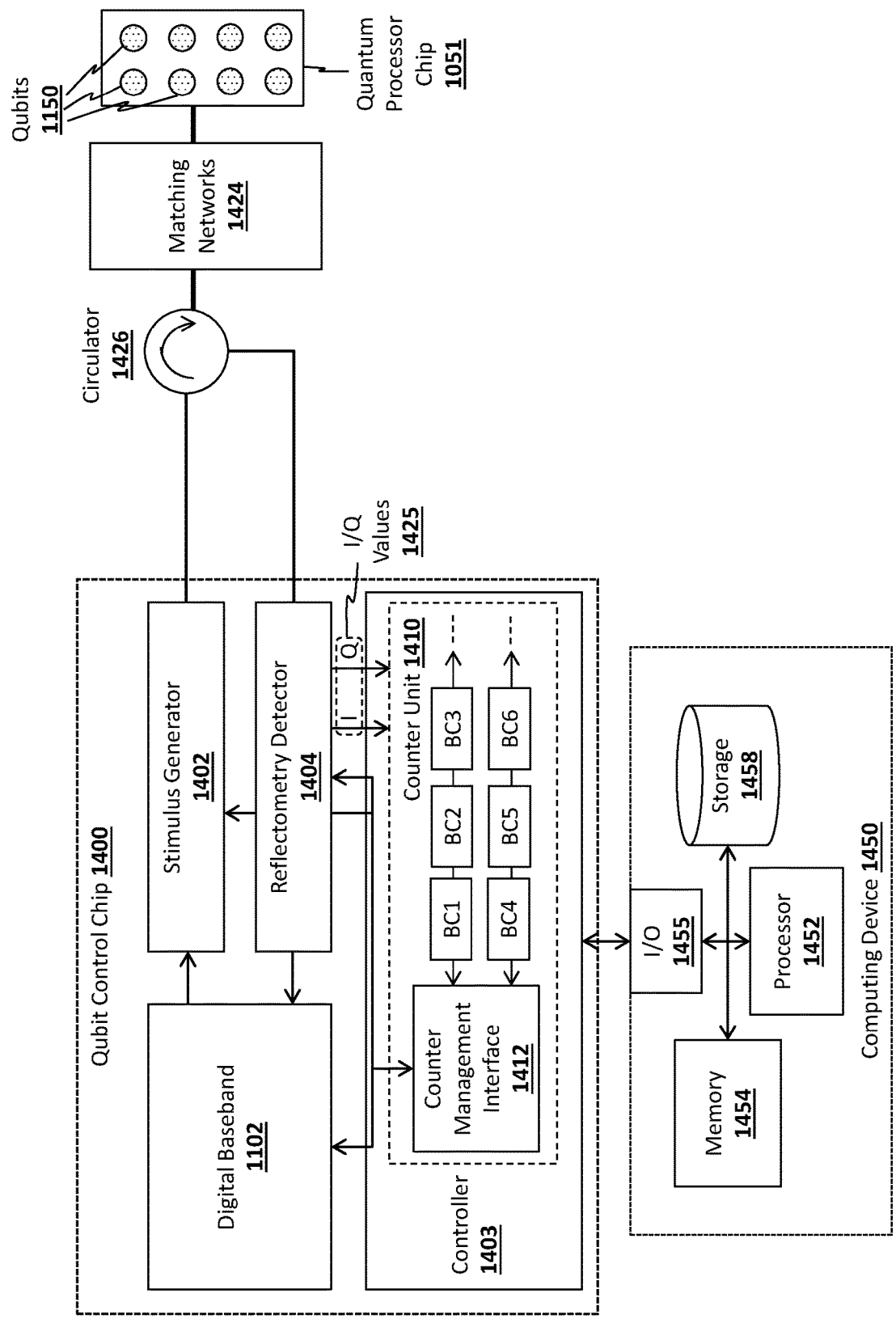
FIG. 14 illustrates one embodiment in which a reflectometry detector relies on counters to track received signals related to qubit state.

One embodiment of the invention will be described with respect to FIG. 14, which illustrates a qubit control chip 1400 coupled to a quantum processor chip 1051 through a circulator 1426, which passes the microwave pulses produced by the stimulus generator 1402 through to the qubits 1150 and, in the reverse direction, passes reflected signals to the reflectometry detector 1404. The illustrated embodiment includes matching networks 1404 to control the impedance seen on the communication channel. For example, matching networks 1404 may be used to match the impedance of qubits (or corresponding single-electron transistors (SETs)) when in baseline states, as described with respect to other embodiments herein. This specific configuration, however, is not required for complying with the underlying principles of the invention.

In one embodiment, the stimulus generator 1402 transmits microwave pulses in accordance with a quantum program, and the resulting reflections are captured by a reflectometry detector 1404. As mentioned, the reflections comprise waveforms with in-phase (I) and quadrature (Q) signal components associated with different qubit states. As such, a histogram of I/Q values can be arranged as shown in FIG. 13B, where different I/Q regions of interest correspond to different qubit states.

In the illustrated embodiment, a computing device 1450 comprising a memory 1454, processor 1452, and persistent storage 1458 is coupled to the qubit control chip 1400 via an I/O interconnect 1755. By way of example, and not limitation, quantum programs may be loaded to a memory of the qubit control chip 1400 and executed by the controller 1403. In this example, the qubit control chip 1400 comprises a system-on-chip (SoC) architecture allowing the qubit control chip 1400 to operate independently of any external computing device 1450.

Alternatively, or in addition, quantum and non-quantum programs may be stored in the memory 1454 of the computing device 1450 and executed by the processor 1450, resulting in sequences of quantum commands transmitted over the I/O interconnect 1455 to a controller 1403 of the qubit control chip 1400.

In contrast to existing implementations which store the entire waveform, the qubit control chip 1400 includes a programmable counter unit 1410 with a plurality of counters BC1-BC6 for counting instances of waveforms detected by the reflectometry detector 1404. In one embodiment, a counter management interface 1412 programs the counters BC1-BC6 and/or provides an interface for programming the counters based on the quantum program code. For example, in one embodiment, each counter is programmed to increment when a value associated with the detected waveform falls within its programmed range (or "bin"). In FIG. 14, for example, the counters BC1-BC6 are programmed to count occurrences of I/Q values 1425 falling within designated regions of interest (ROIs) (e.g., designated minimum and maximum I/Q combinations).

Although illustrated as a separate unit for purposes of illustration, the counter management interface 1412 may be integral to the operational circuitry of the controller 1403. For example, reading and writing the counters may be one of the functions provided by the controller 1403. Additionally, while the counter unit 1410 is illustrated as a separate unit within the qubit control chip 1400, it may be integrated directly within the logic of the reflectometry detector 1404 and/or any other components of the qubit control chip 1400 while still complying with the underlying principles of the invention.

In one implementation, the counters BC1-BC6 are programmed as bin counters, with each counter being associated with a particular range of values (e.g., I/Q values in one embodiment). In response to the reflectometry detector 1404 receiving a waveform within a particular range or set of ranges (e.g., having particular I/Q values), the bin counter BC1-BC6 associated with this range is incremented. In this way, histogram data such as shown in FIG. 13B may be collected and stored with significantly reduced power requirements compared to current implementations which store waveforms. In one implementation, the controller 1403 and/or the counter management interface 1412 includes binning logic to compare the values of a current waveform with ranges defined for the various bin counters. The appropriate counter is then incremented once the bin has been identified.

Figure 15:
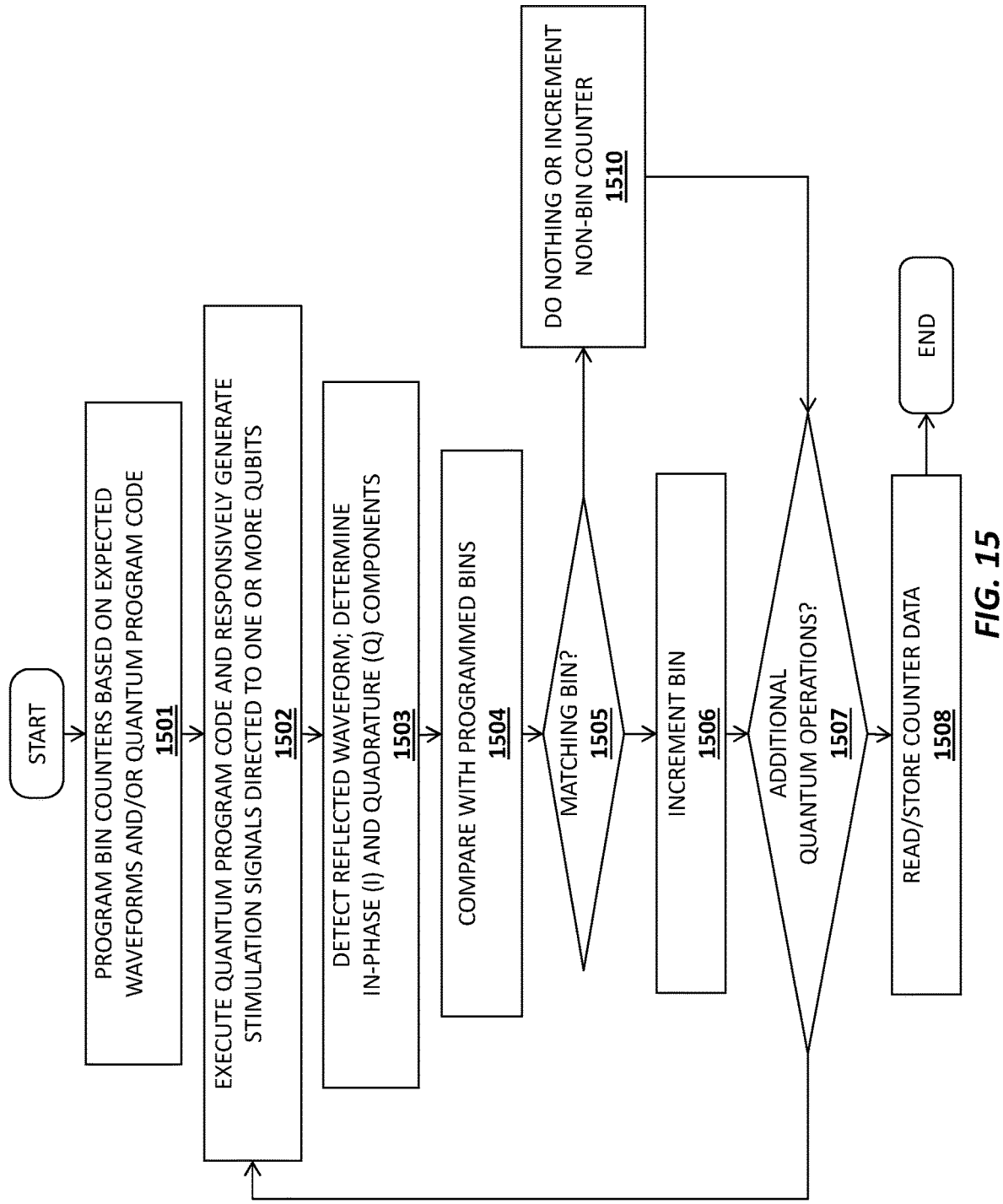
FIG. 15 illustrates a method for implementing bin counters in accordance with one embodiment of the invention.

A method in accordance with one embodiment of the invention is illustrated in FIG. 15. The method may be implemented within the context of the architectures described above, but is not limited to any particular architecture.

At 1501 a set of bin counters are programmed based on expected waveforms and/or quantum program code. For example, the bin counters may be programmed automatically based on executing quantum program code and/or manually by the end user. Alternatively, or additionally, the range of all possible/practical I/Q values may be subdivided across all or a subset of the available counters.

At 1502, the stimulus generator generates microwave pulses in response to the execution of the quantum program. At 1503, a new reflected waveform is detected and the I and Q components of the waveform determined.

At 1504, the I/Q values are compared against programmed bins. If the I/Q values fall within the range of a bin, determined at 1505, then the counter associated with that bin is incremented at 1506. If the I/Q values do not fall within the range of a programmed bin, then either the data is ignored or a non-bin counter is incremented at 1510. For example, in one embodiment, a catch-all or default bin is used to count the number of non-bin signals detected.

If additional quantum operations are to be performed, determined at 1507, then the process repeats from operation 1502. If no additional quantum operations are to be performed, then the process ends.

One embodiment of the invention includes a reflectometry detector which counts instances of waveforms falling within specified I/Q ranges, revealing the qubit states associated with those waveforms. Moreover, by using programmable bin counters, this embodiment consumes significantly less power than existing solutions to collect such data.

Once histogram data has been collected via the counters as described herein, it may be transferred to a computing device 1450, stored in memory 1454 for analysis and/or persistently stored within a mass storage device 1458. For example, in one embodiment, computing device 1450 executes program code to generate a histogram using the data, such as that illustrated in FIG. 13B.

The embodiments of the invention described above may be used in combination with any of the other embodiments of the invention described herein. For example, in one embodiment, a plurality of counters are configured as described above on a system which also implements rectangular pulse generation, frequency planning techniques, and/or clock distribution as described below.

Apparatus and Method for High-Resolution
Rectangular Pulse Generation for Qubit Control
and Readout The control of qubit gates requires rectangular pulses of very high precision in the final settled value (e.g., within tens of microvolts), as well as small rise times in the order of ns (i.e., highspeed pulsing). Current integrated digital-to-analog converters (DACs) with the required resolution and speed can be power- and silicon-area hungry. Given the limited power budget for a cryogenic controller placed in the 4K plane of a dilution refrigerator and the need for many DACs to control many qubit gates at the same time, conventional DAC design does not scale well to quantum computers with many qubits (e.g., hundreds or thousands).

Previous implementations address this issue using a generic high-speed Nyquist rate DAC with high precision. However, a generic Nyquist-rate DAC requires very high precision, which increases chip area and power consumption due to added mismatch and calibration constraints. Consequently, Nyquist rate DACs also consume too much power and silicon area to be applied to cryogenic controllers for a large number of qubits.

Embodiments of the invention address the above limitations. In particular, in one implementation where the DAC only needs to generate square pulses, it is not continuously clocked at high-speed, but rather controlled by a trigger signal which is raised when the pulse needs to start and lowered when the pulse needs to stop. The amplitude of the pulse is provided to the DAC before the trigger signal is generated, so DAC settling time is also relaxed. Since the DAC needs to update its code once per pulse rather than every clock cycle, one embodiment of the invention uses a look-up-table (LUT) to calibrate the non-linearity (e.g., integral nonlinearity (INL) and differential nonlinearity (DNL)) with a minimal power penalty. Therefore, in one embodiment, the DAC is designed with redundancy using binary scaling with a radix <2. This allows very small unit element sizes to be used, saving power and silicon area. The redundancy addresses the larger mismatch introduced by small unit elements and guarantees that the DAC has no missing codes, thereby covering all the required output voltage levels. Using redundancy, the input-code/output-voltage characteristic is linearized via the LUT as described below.

FIG. 16A illustrates an example of a trigger signal 1604, a data input 1602, and a corresponding voltage output pulse 1606. FIG. 16B illustrates one embodiment of an apparatus with a lookup table (LUT) coupled to an 8-bit DAC with redundancy 1620. The LUT 1614 includes a plurality of entries, each entry mapping a 7-bit data input code to an 8-bit DAC control code. In one implementation, the LUT 1614 includes 128 entries, although the underlying principles of the invention are not limited to any particular LUT size.

In operation, the 8-bit DAC with redundancy 1620 generates RF pulses based on an 8-bit DAC control code provided from the LUT 1614 combined with the trigger signal 1604. As mentioned, the DAC 1620 is controlled by the trigger signal 1604 instead of being continuously clocked. In one embodiment, the trigger signal 1604 is raised when the pulse needs to start and lowered when the pulse needs to stop. The amplitude of the pulse is specified by the 8-bit output from the LUT 1614 which is provided to the DAC 1620 before the trigger signal 1604 is generated, relaxing the DAC settling time.

A manual 8-bit data input 1612 may be used to calibrate the DAC 1620. For example, a sequence of 8-bit values may be manually input to the DAC 1620 and the results measured. In one embodiment, the LUT is programmed to map 7-bit input data values to the 8-bit codes to linearize the input-output voltage characteristic of the DAC, as indicated in FIG. 16C.

A resolution of 11-12 bits is typically required for a rectangular pulse required to control a qubit. The pulse has a duration of 10 ns to 1 ms, with a rise and fall time requirement of <5 ns, implying the need for a high-speed, high-resolution DAC. However, the embodiments of the invention take advantage of the fact that only a rectangular pulse is required. With very high mismatch, redundancy is added, resulting in the output versus input code plot 1650 illustrated in FIG. 16C for a representative 8-bit DAC 1620.

In one embodiment, the high redundancy of the DAC 1620 is designed to only have negative differential nonlinearity (DNL) versus code (e.g., as in the plot 1660 of DAC differential non-linearity (DNL) vs input code), which is calibrated via the entries in the lookup table 1614. A positive DNL would result in missing codes, meaning that the DAC could not provide all the required voltage outputs. While the on-chip area for a high resolution DAC would normally be very large due to mismatch requirements, one embodiment of the invention tunes the mismatch to a point where the DAC 1620 area is significantly reduced.

In one embodiment, the lookup table 1614 pre-distorts the desired output versus code plot 1650. Since only rectangular pulses are required, the DAC 1620 can continue to operate at high speed, while the lookup table 1614 is only accessed once at the beginning of every pulse. This saves the digital power consumption as pulse durations are very long in comparison to the DAC input data sampling time period. Moreover, in one embodiment, the lookup table 1614 is only accessed once per pulse.

Figure 16D:
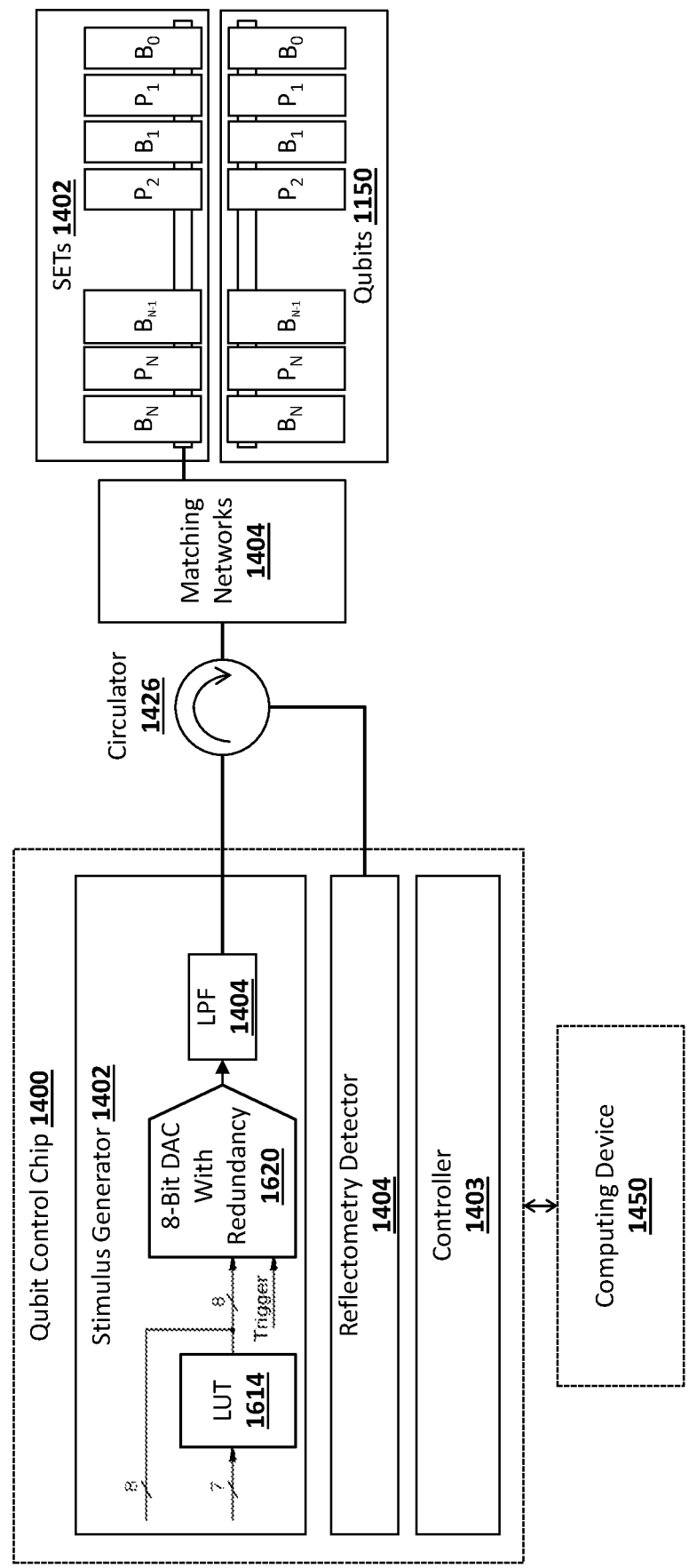
FIG. 16D illustrates an embodiment in which the LUT and DAC are integrated within a stimulus generator.

FIG. 16D illustrates an example quantum processing system on which embodiments of the invention may be implemented including a quantum control chip 1400. The LUT 1614 and DAC 1620 are integrated within a stimulus generator 1402 to generate the rectangular pulses as described above. For example, in one embodiment, calibration of the DAC 1620 is performed to identify the 8-bit DAC control codes to be mapped to data input values 1602 in the 128 entries of the LUT 1614. The rectangular pulses may be passed through one or more low pass filters 1404 as previously described. Although not illustrated, mixers may also be used. The resulting RF pulse is then transmitted via the circulator 1426.

The illustrated embodiment includes matching networks 1404 to control the impedance over the communication channel. For example, in one embodiment, a matching network 1404 matches the impedance of each single electron transistor (SET) 1402 when its associated qubit 1150 is in a baseline (e.g., non-excited) state. In operation, each SET 1402 forms a capacitive coupling with one of the qubits 1150. When the state of the qubit 1150 changes, the capacitive coupling changes the impedance of the SET 1402, and the corresponding signal reflections can then be detected by the reflectometry detector 1404 (as described with respect to other embodiments).

The qubits 1150 in the illustrated example include N data qubits $P_1, P_2, \ldots P_N$, and a corresponding set of N barrier qubits $B_1, B_2, \ldots B_N$ which operate to block or permit interaction between adjacent data qubits. For example, when the barrier potential of barrier qubit $B_1$ is above a threshold, data qubits $P_1$ and $P_2$ are prevented from interacting. A rectangular pulse may be generated via the LUT 1614 and DAC 1620 using the techniques described herein to lower the barrier potential of barrier qubit $B_1$, thereby allowing data qubits $P_1$ and $P_2$ to become entangled (e.g., in order to implement multi-qubit gates). It should be noted, however, that this particular application of the rectangular pulses generated by LUT 1614 and DAC 1620 is described as one example of the embodiments of the invention. The underlying principles of the invention are not limited to any particular application.

In one embodiment, the entries of the LUT 1614 may be programmed via the controller 1403 based on testing and calibration via the calibration input 1612 to the DAC 1620. For example, different 8-bit DAC control values may be tested with trigger signals to determine the values required to modify the barrier potential of each of the barrier qubits $B_1, B_2, \ldots B_N$. The resulting 8-bit values are then stored in the LUT 1614. As in prior embodiments, programming changes may be implemented via the computing device 1450 coupled to the qubit controller chip 1400 over an interconnect.

The embodiments of the invention described above allow the implementation of low-power, low-area DACs to generate precise rectangular pulses to control qubit gates. This permits scaling to a large number of qubits (e.g., >1000) and enables cryogenic control for large scale quantum computers.

Apparatus and Method for Large-Scale Spin Qubit State Readout

As mentioned above, in certain embodiments of the invention, a physical qubit is capacitively coupled to a single electron transistor (SET) such that the SET impedance is modulated depending on the qubit state. An RF reflectometry unit comprising a transmitter, a hybrid/circulator, a SET matching network, a qubit chip, and a receiver, are configured to monitor the SET impedance. A stimulus generator produces a stimulus signal that is fed to the SET through a hybrid/circulator and a SET matching network. Depending on the SET impedance, the stimulus signal is either absorbed or reflected. The hybrid/circulator separates the reflected signal from the stimulus signal and a receiver monitors the reflected signal to determine the qubit state.

One embodiment of the invention includes a stimulus generator comprising a high speed DAC and a low pass filter, but no I/Q mixer, thereby eliminating the problems associated with local oscillator (LO) leakage and harmonic mixing tones. In addition, in one embodiment, advanced frequency planning is performed in combination with synchronous clock control to ensure that any unwanted harmonics generated by system components fall within the filtering range of one or more low pass filters or other signal filtering circuitry.

Figure 17A:
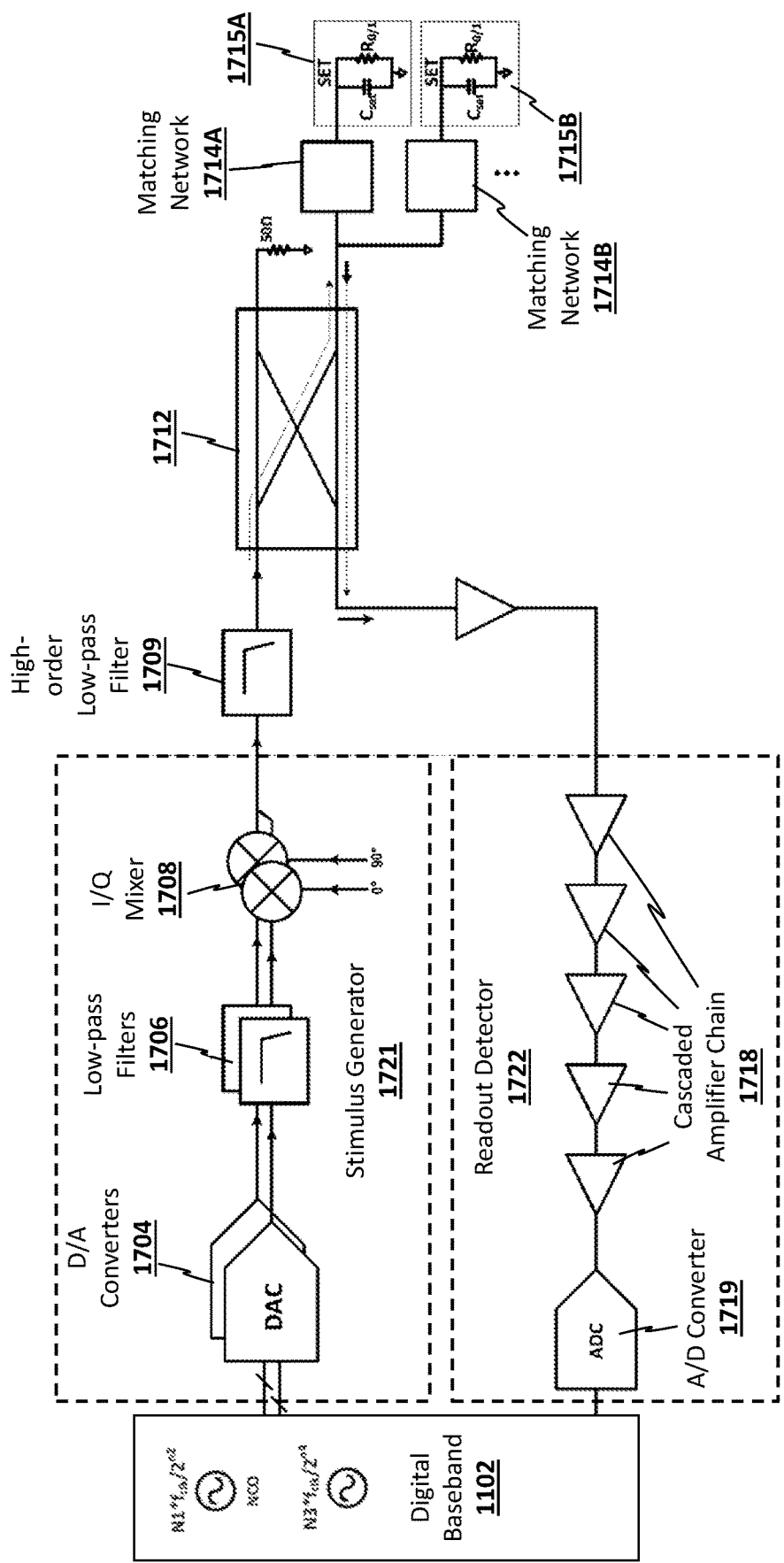
FIG. 17A illustrates a conventional stimulus generator and readout detector.

FIG. 17A illustrates a conventional arrangement in which a stimulus signal is generated by a stimulus generator 1721 and the reflected signals are received by a readout detector 1722. The stimulus generator includes D/A converters 1704 which generate waveforms in accordance with a digital baseband signal from the digital baseband unit 1102. Lowpass filters 1706 filter out frequencies higher than a specified threshold and the frequency/phase of the filtered signal is adjusted by an I/Q mixer 1178 to produce the desired stimulus signal at the desired frequency.

The conventional stimulus generator 1721 suffers from local oscillator (LO) signal leakage and/or harmonic mixing tones produced by the I/Q mixer 1708. For example, assuming a 300 MHz stimulus signal and a local oscillator (LO) signal at 250 MHz, the third harmonic mixing tone at 700 MHz can be completely reflected at the SET matching network 1714A-B, regardless the state of the SET 1715A-B. The reflected signal is thus processed by the readout detector 1722, which amplifies the unwanted components of the signal via a cascaded amplifier chain 1718. The reflected signals may saturate the receiver chain 1718, which includes a high-gain cascaded amplifier chain 1718, and are mixed with the receiver LO harmonics and frequency down-converted via A/D converter 1719 and the digital baseband 1102, acting as blockers.

To mitigate this problem, one or more high-order active low-pass filters 1709 are configured at the output of the stimulus generator 1721 to perform selective filtering to reject spurious tones. The resulting waveform is transmitted over a channel 1712 (e.g., hybrid or circulator) to a matching network 1714A-B which matches the impedance of a groups of single-electron transistors (SETs) 1715A-B when their respective qubits are in baseline states (as described with respect to other embodiments herein).

For a cryo-CMOS integrated chip solution, however, the high-order active low-pass filter 1709 at the output of the stimulus generator 1721 can add excessive thermal noise. Moreover, at the readout detector 1722, the high-gain cascaded amplifier chain 1718 may cause instability due to parasitic feedback from the output to the input of the readout detector 1722. Furthermore, the cascaded amplifier chain 1718 has a limited bandwidth and cannot support a high frequency operation. An I/Q frequency down-conversion receiver architecture has been proposed to achieve a high gain without instability for a higher frequency operation. However, for a cryo-CMOS integrated chip solution, spurious mixings among LO harmonics and the co-integrated digital processor clock spurs may saturate the RF/baseband amplifier and/or behave as blockers. Furthermore, the I/Q frequency down-conversion receiver cannot cover a low frequency band.

Figure 17B:
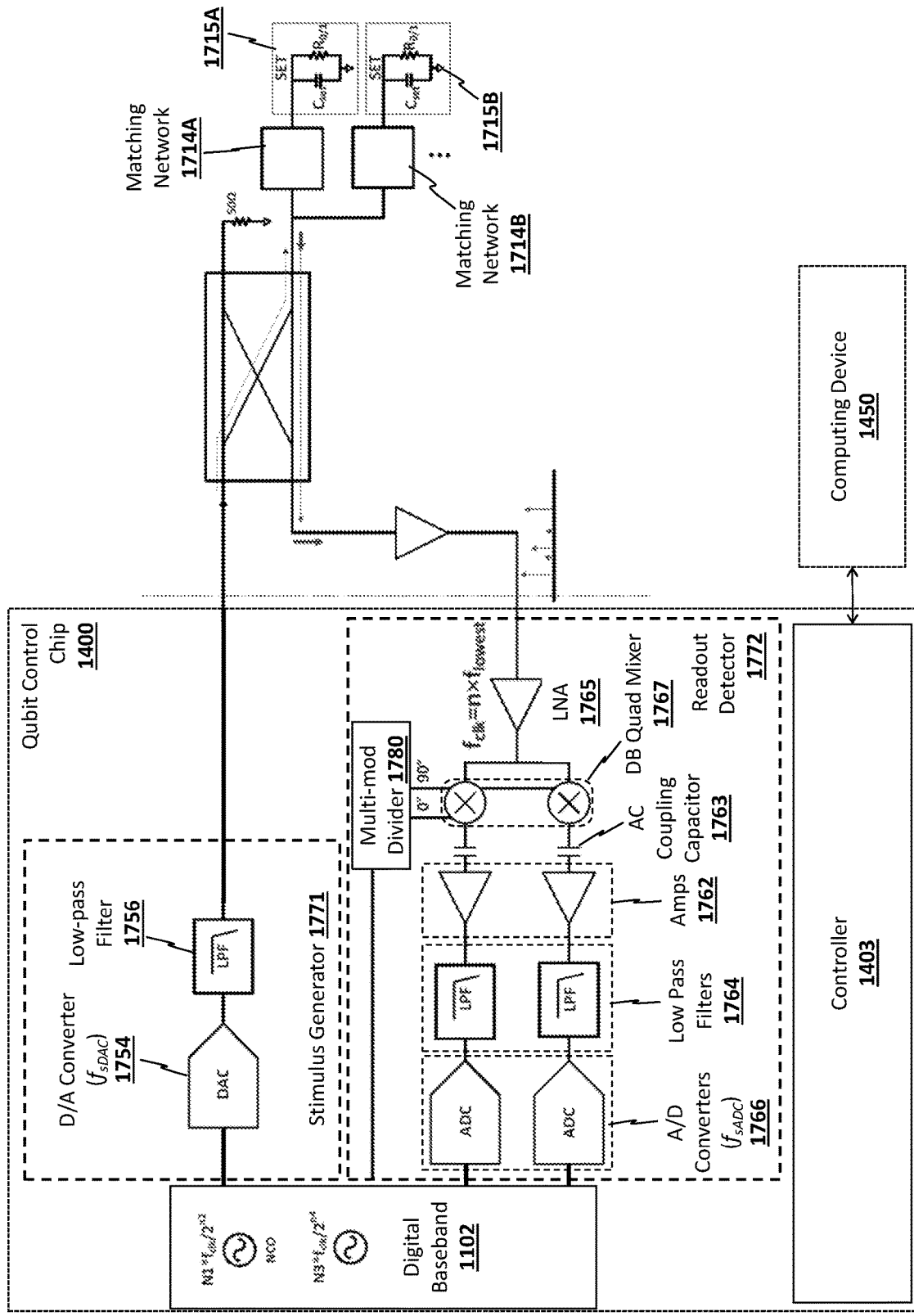
FIG. 17B illustrates one embodiment of a qubit control chip for reducing noise within a quantum computing system.

FIG. 17B illustrates one embodiment of the invention which addresses these problems. In particular, this embodiment includes a stimulus generator 1751 comprising a high-speed digital to analog converter (DAC) 1754 and lowpass filter 1756 to directly synthesize the stimulus signal without I/Q mixers or high-order active filters, thereby avoiding any LO leakage to the qubits and/or harmonic mixing tones. No mixers are required because the DAC 1754 produces a stimulus signal at the desired frequency and any replica tones generated by the DAC 1754 are out-of-band, since the DAC is clocked at a sufficiently high frequency (e.g., 2 GHz, etc) to ensure that these tones will be removed via the lowpass filters 1756, 1764 and/or AC couplers 1763.

The high-speed digital to analog converter (DAC) 1754 may operate as described above with respect to FIGS. 16A-D (e.g., using a lookup table (LUT) and trigger signal to generate rectangular pulses). However, the underlying principles of the invention are not limited to this particular configuration.

In one embodiment of the invention, the readout detector 1772 is an I/Q up/down converter receiver with high gain (e.g., 100 dB or more). In this implementation, the readout detector 1772 can simultaneously demodulate the multi-tone signals reflected from multiple SETs 1715A-B to support readout for simultaneous multiple-qubit states.

In particular, the reflected signal is first amplified by low noise amplifier (LNA) 1765 and the amplified signal is processed by a double-balanced quadrature mixer 1767 controlled by a multi-modulus divider 1780 to support both a low frequency band (up conversion) and a high frequency band (down conversion). In one implementation, the multi-modulus divider 1780 and double-balanced quadrature mixer 1767 ensure that the digital baseband 1102 clock frequency is an integer multiple of the LO mixer frequency ($f_{dig}=n \times f_{lo}$) to remove clock spurs and low frequency beat tones. For example, with a digital baseband frequency ($f_{dig}=n \times f_{lo}$) of 600 MHz and a LO frequency of 300 MHz, spurious mixing tones ($n_1 \times n \times f_{lo} \pm f\ n_2 \times f_{lo} = (n_1 n \pm n_2) \times f_{lo}$)) are either folded at DC or the harmonics of the LO. The DC components are then removed by the AC coupling capacitor 1763 and any LO harmonics are removed by low pass filters 1764. This is particularly important as the qubit-state readout detector 1772 may have a very high gain (e.g., greater than 100 dB), provided by the LNA 1785 and I/Q amplifiers 1762 following the double-balanced quadrature mixer 1767.

One embodiment of the double-balanced quadrature mixer 1767 includes one mixer which operates at the LO frequency and one which operates at the LO frequency with a 90° phase shift, so that both phase and amplitude information will be available at the digital baseband 1102. The in-phase and quadrature signals are passed through the parallel AC coupling capacitors 1763 to remove the DC signal components. The resulting signals are then amplified by I/Q amplifiers 1762 and filtered by parallel low pass filters 1764. As mentioned, because frequencies of the various system components are intelligently selected as described herein, any harmonics or other unusable frequencies will be within a range that will be removed by the low pass filters 1764. The filtered signals are then converted to digital by parallel A/D converters 1766. The in-phase and quadrature signals are then processed by the digital baseband 1102 (e.g., communicating with controller 1403 and/or computing device 1450 to plot the results in an IQ histogram as described with respect to FIG. 13B).

The operating frequency of qubit-state readout can be very wide depending on the types of SET matching networks 1714A-B and SET device output capacitances (e.g., from 50 MHz to 1 GHz). In one embodiment, for a high frequency operation, the multi-modulus divider 1780 is configured for a frequency down-conversion. For example, the input signal tones may be distributed from 400 MHz to 800 MHz, with the local oscillator (LO) frequency at 600 MHz (e.g., the frequency of the DB quad mixer 1767), and with an ADC 1766 analog bandwidth of 200 MHz. In this specific example, the digital baseband 1102 frequency down-converts the resulting signal to between −200 MHz and +200 MHz and then demodulated by a digital baseband 1102.

On the other hand, for a low frequency operation, the multi-modulus divider 1780 is configured for a frequency up-conversion. For example, the input signal tone at 50 MHz with LO frequency setting of 150 MHz (600 MHz/4) is frequency upconverted to 100 MHz, which is within the bandwidth of the A/D converters 1766 and demodulated by the digital baseband 1102. Note that the other tone at 200 MHz will be filtered by a high-order programmable low pass filter 1764 before ADC 1766.

With advanced frequency planning and synchronous clocking spanning the qubit control chip 1400, including the digital baseband 1102, readout detector 1172 and stimulus generator 1771, spurious mixing tones and LO harmonics are removed, mitigating the need for components that would otherwise consume additional power and produce additional noise.

Clockless Activity-Based Clock Control for Low Power Cryogenic Quantum Socs

Newer manufacturing processes exhibit a substantial increase in clock tree dynamic power dissipation. This is largely due to an increased wire resistivity with metal stack miniaturization, increased buffer driving strengths, congestion issues and stronger side effects of yield increasing manufacturing techniques like metal fill. Moreover, the high data rate signal processing required for qubit control requires operating frequencies in the GHz ranges. High clock speeds at high voltage supply lead to significant increases in the dynamic clock power dissipation. Power domain partitioning provides a remedy for those cases where resources are not required over a longer time period (e.g., hundreds of microseconds) and where the resulting latency does not affect performance. On the other hand, the power-on active and idle use cases require fast, load-based dynamic clock control, which is currently not possible with existing running-clock and firmware-based control.

Traditional clocking solutions rely on firmware-controlled running-clock clock gating based on large scheduling events across a multitude of functional units. Both the control source (e.g., a CPU, finite state machine, etc.) and the target (clock gates) require a running clock and are often located at a distance from the clock source and each other. Hardware-based events are used to stop clock tree trunks with firmware or clocked timers to re-enable the clocks. Shared resources cannot be efficiently clock gated at a finer granularity.

The power budget at cryogenic temperatures is very limited (e.g., less than 2 W at 4 Kelvin) and inefficient power management leads to a reduction in overall functionality. Hierarchical fine-grain clock tree control is not possible on current implementations, resulting in high clock tree power dissipation. Often there is a significant physical distance between the clock source and the control block which wastes time in wakeup delays and always-on power and clock domains are required for wake-up. When the control target requires clocking then the major source of dynamic power dissipation, the clock trunk, must remain active. In cases with multiple users of a functional unit, firmware-based idle clock tree gating is hindered by cross controller communication latency and nonoverlapping activity patterns. Firmware-based source control clock gating sees a chain of hardware accelerators as a cohesive active block and cannot exploit the individual idle times. Furthermore, firmware-controlled clock gating at a useful granularity is not possible, even at the top of the clock tree, let alone within the individual hardware accelerators.

One embodiment of the invention addresses these limitations with a clockless hierarchical activity-based clock control architecture for cryogenic SoC applications such as the various implementations described herein. In particular, this embodiment triggers an automatic wake-up in response to detecting incoming traffic and automatically shuts down during idle periods. One embodiment of the invention performs asynchronous activity information exchanges in which each control element is placed at the best position within a layout macro for maximum efficiency and without timing limitations. In this embodiment, the control element does not keep the clock trunk to the layout macro active. A hierarchical approach to clocking is used in one implementation to save as much power as possible without affecting the functionality of the system. Idle time hysteresis may also be employed to avoid premature clock gating and unwanted delay. These embodiments of the invention provide a superior tradeoff between performance, wake-up latency, and dynamic power reduction.

When integrated within a quantum controller SoC or any other type of circuit, the activity-based clock control architecture may become an integral part of a functional block's layout macro, but does not require always-on nested power domains and clock domains. Instead, clock gating through glitch-free combinational handshakes and clock scaling through glitch-free combinational activity signals are used. In one embodiment, individual components form a finite set of blocks which are developed and individually verified before being instantiated across all functional blocks in a consistent, low risk manner.

A cryogenic control SoC consists of multiple macros controlling different aspects of a qubit control chip. For example, in the qubit control chip 1400 in FIG. 14, separate sets of macros or "partitions" may be implemented within the controller 1403, reflectometry detector 1404 and stimulus generator 1402. In one embodiment, the macros switch between active and idle states asynchronously as they execute a quantum algorithm over an extended period of time. The embodiments of the invention ensure that no unnecessary dynamic power is dissipated while a particular macro block is in an idle state waiting for the right moment to perform its task. Fine-grain clock tree power control is vital for driving low cryogenic energy per bit.

One embodiment of the invention will be described with respect to FIG. 18, which shows an example system where vertical clock control is partitioned into levels based on the IP structure, size, clock distribution, clock crossing and functional partitioning of the chip. The example system is subdivided into a plurality of partitions 1810, 1820, 1830, and 1840 (also referred to herein as "macros") and a clock management unit 1850. Certain partitions 1810, 1820, 1840 have a single clock aggregator 1811, 1821, 1841, respectively, while other partitions, such as partition 1380, are further subdivided into a plurality of functional blocks 1831-1834, each of which may be clocked by one of a set of aggregators 1831-1833.

In the illustrated implementation, the partitions 1810, 1820, 1830, and 1840 may be different functional components within any type of processor or controller. For example, in a quantum processor controller, partition 1810 may be the D/A converter 1754 while partition 1820 may be the low pass filter 1756 of the stimulus generator 1771 described above. Continuing with this example, partition 1830 may be the controller 1403 and partition 1840 may be the readout detector 1772 (or portions thereof). Note that these are merely examples; the underlying principles of the invention are not limited to any particular assignment of the partitions 1810, 1820, 1830, 1840. Moreover, while four partitions are shown for purposes of explanation, the embodiments of the invention may be implemented with many more partitions or fewer partitions.

As mentioned, each partition 1810, 1820, 1830, 1840 includes or is associated with one or more clock aggregators 1811, 1821, 1831-1833, 1841, respectively. In one embodiment, each aggregator is associated with a different clock domain which operates at an independent frequency. Thus, partitions 1810, 1820, and 1840 operate within three separate clock domains controlled by clock aggregators 1811, 1821, and 1841, respectively, while partition 1830 operates within three independent clock domains corresponding to clock aggregators 1831-1833.

Each aggregator 1811, 1821, 1831-1833, 1841 is coupled to one of the clock satellite blocks 1851-1853 of a clock management unit 1850 (e.g., to make asynchronous clock requests as described below). In one embodiment, the clock satellite blocks 1851-1853 include the source phase-locked loops (PLLs) which generate the source clock signals distributed via the clock aggregators 1811, 1821, 1831-1833, 1841 of the partitions 1810, 1820, 1830, 1840. In one embodiment, the clock aggregators 1811, 1821, 1831-1833, 1841 are physically positioned at the periphery of each respective partition 1810, 1820, 1830, 1840 so that a partition can be fully clock-gated without requiring internal clock lines to an aggregator to be active. The clock signals generated by the clock satellites 1851-1853 may be passed through clock dividers or other clocking circuitry within the aggregators 1811, 1821, 1831-1833, 1841 to scale the frequencies for each individual clock domain, based on variables such as power dissipation and workload. Thus, in addition to clock gating, the aggregators in some embodiments also perform clock scaling to reduce power consumption.

In one embodiment, Level 1 clock gating (not shown in FIG. 18) is applied at the flip-flop level, within individual partitions 1810, 1820, 1830, 1840, blocks 1831-1834, and other functional units of the chip. Level 1 clock gating provides the ability to control the clock within a clock cycle synchronously, with no additional latency added to the data path. In one implementation, this is the only synchronous clock control level and is also the clock gating level furthest away from the clock source. In one embodiment, Level 1 clock gating is enabled as long as there is no data transport through the individual signal processing sections with gating/un-gating taking effect clock cycle by clock cycle. No additional latency will be incurred as a trade-off to an almost zero clock trunk gating. This clock gating level attempts to remove the sequence cell dynamic power dissipation to the extent possible.

Figure 18:
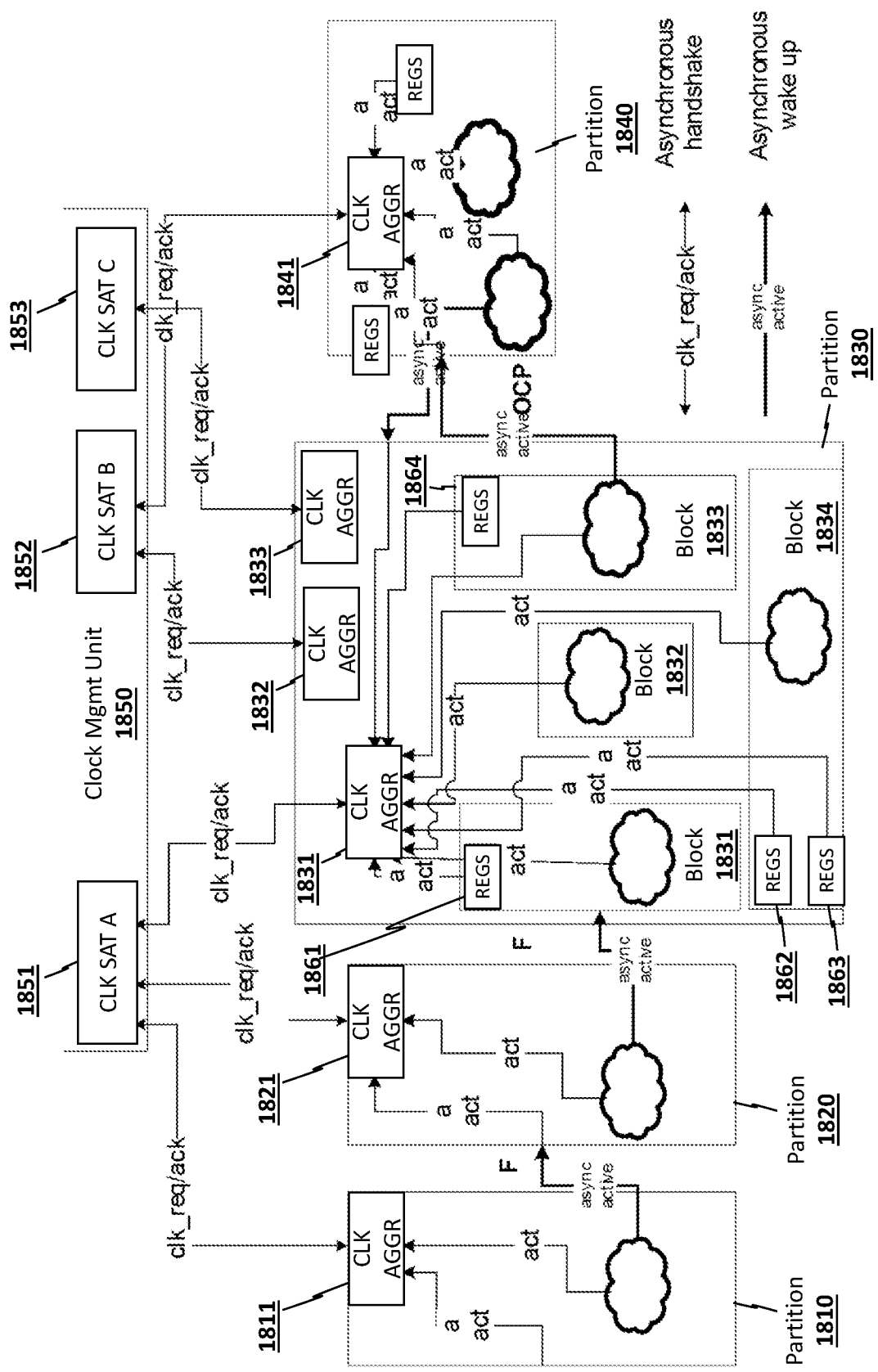
FIG. 18 illustrates one embodiment of the invention for activity-based clock control.

In one embodiment, Level 2 clock gating is implemented at the partition level, i.e., for individuals partition 1810, 1820, 1830, 1840, as illustrated in FIG. 18. As mentioned, for every incoming clock trunk, a minimum of one clock aggregator block 1811, 1821, 1831-1833, 1841 is instantiated. Note, however, that the actual clock gate can be implemented internally or externally to the various clock aggregators 1811, 1821, 1831-1833, 1841.

In one implementation, each clock aggregator 1811, 1821, 1831-1833, 1841 collects and performs de-glitching of asynchronous activity, and uses the activity to control its respective clock trunk. Deglitching may include automatically waiting an additional one or more clock cycles upon detecting a combinational control signal as described herein, to ensure the validity of the control signal (e.g., to account for transient, erroneous signals).

Any type of activity which anticipates a required clocking state may be used to control the operation of the aggregators 1811, 1821, 1831-1833, 1841 as described herein. In one particular embodiment, the activity may be signaled by an early incoming data indication from preceding partitions 1810, 1820, 1830, 1840, shown as "async active" arrows in FIG. 18, and/or the status of blocks in the current partition (e.g., blocks 1831-1834), shown as internal "act" arrows within each partition (produced by the cloud elements representing functional partition circuitry). The "async active" and "active" signals may be combinational control signals which are driven to a high state (a binary 1) in response to activity and which are in a low state (a binary 0) with no activity.

The "preceding" partition/block refers to a partition/block associated with an earlier stage in the overall processing pipeline. For example, in a given processing transaction, a first partition 1810 may be required to perform a first set of operations (e.g., digital to analog conversions) before a second partition 1820 can perform a second set of operations (e.g., signal filtering and transmission). Thus, in FIG. 18, in response to activity within partition 1810 the async active signal is driven high to notify the clock aggregator 1821 and/or the clock satellite block 1851 that the resources provided by partition 1820 will soon be required. The satellite block 1851 and/or the aggregator 1821 may then initiate the process of activating the clocks to partition 1820. This dynamic communication between partitions allows for nearly 100% partition lock trunk gating.

Even when partition 1820 is fully gated, its clock aggregator 1821 is still capable of receiving and processing the combinational logic signal to indicate activity in the preceding partition 1810 (e.g., a binary 1). Moreover, the logic in partition 1810 may generate the asynch active signal to notify clock aggregator 1821 several clock cycles in advance of the data (e.g., 5, 10, 15 cycles) to provide sufficient time for it to un-gate the clock trunk to partition 1820.

In one embodiment, each aggregator includes a synchronizer 2-stage flip flop to use the asynch active and/or active combinational signal to trigger the synchronous clock signal. Two (or more) stages are included to ensure that the combinational signal is not a glitch. For example, the combinational signal must be maintained for two (or more) cycles before the corresponding aggregator moves forward with un-gating the clocks to the corresponding partition.

In one embodiment, in the absence of activity, a clock aggregator 1811, 1821, 1831-1833, 1841 waits for a programmable number of cycles, based on a desired hysteresis response, before initiating a data boundary lock to clock-gate the relevant partition. As mentioned, the internal and external activity signals (e.g., async active and active, respectively) may be generated combinationally and transported with potential glitches through the aggregators 1811, 1821, 1831-1833, 1841 all the way to the final clock gating level (e.g., the clock satellite blocks 1851-1853 of the clock management unit 1850).

In FIG. 18, the next level above the clock aggregators 1811, 1821, 1831-1833, 1841 is the clock satellite blocks 1851-1853 within the clock management unit 1850. Assuming that Level 1 clock gating is implemented at the flip-flop level and the aggregators 1811, 1821, 1831-1833, 1841 operate at Layer 2, the clock satellite blocks 1851-1853 operate at "Layer 3" of the distributed clock hierarchy. As mentioned, in one embodiment, each of the clock satellite blocks 1851-1853 includes a source PLL generating a clock signal which is distributed along a respective clock trunk (or branched to multiple trunks) to the partitions 1810, 1820, 1830, 1840.

In one embodiment, in response to detecting inactivity in its own partition and/or adjacent partitions for a programmable time period (sometimes referred to as the "idle hysteresis" time period), a clock aggregator 1811, 1821, 1831-1833, 1841 generates a clock request signal to the appropriate clock satellite block 1851-1853 when entering a boundary lock. For example, the clock request signal may comprise a binary 0 using combinational logic. The data lock path is acknowledged by the clock satellite block 1851-1853 and the clock trunk is gated at the aggregator 1811, 1821, 1831-1833, 1841. Because the boundary lock request/ack handshakes are asynchronous, the clock trunk gating can be performed right at the boundary of the partition (e.g., at the aggregator) or at any point of clock trunk forking. The boundary data path does not need to stay clocked in this implementation because the preceding partition/block can asynchronously transmit a wake-up activity indication directly to the clock aggregator 1811, 1821, 1831-1833, 1841 using combinational logic (e.g., driving an async activity signal line or activity signal line high).

In response to detecting an activity signal from its own partition or another partition, one embodiment of a clock aggregator 1811, 1821, 1831-1833, 1841 generates a clock request signal to activate clocking for its partition, driving the combinational signal to the corresponding satellite block 1851-1853 high (a binary 1). In one embodiment, the clock request signal is driven high combinationally based on all aggregated asynchronous activity signals and activity signals, rather than synchronized incoming activity. This allows for a clock request from a partition which is not clocked.

The clock request logic remains high until it again detects no activity via the async activity and/or activity signals during the programmable idle hysteresis period. It then generates a clock gating request to the appropriate satellite block 1851-1853 and locks all boundaries to the partition (i.e., performs partition-wide clock gating).

Note that multiple clock aggregator blocks 1811, 1821, 1831-1833, 1841 can be placed next to each other in parallel on the same clock trunk, if the trunk partitions 1810, 1820, 1830, 1840 are not active at the same time. Further, the clock aggregator blocks 1811, 1821, 1831-1833, 1841 can be cascaded with clock request handshakes connecting to fence/lock handshakes, if layout clock trunk partitioning can benefit from running a common trunk to a clock fork point. Level 2 clock gating as described here reduces the dynamic power consumed in all level 1 ungated flip-flops; the level 1 clock gates and the clock tree fan out up to the layout or sub-trunk boundary.

Level 3 clock gating, realized with clock satellite blocks 1851-1853, is instantiated within or next to the clock trunk source clock management unit (CMU) 1850. In one implementation, the CMU 1850 manages one or more of the source PLLs for the clock trunks, Level 3 clock gating circuitry, and (in some embodiments) clock scaling circuitry. The clock satellite blocks 1851-1853 may be positioned directly adjacent to the source PLLs and clock multiplexors to provide glitch free load-based activity for clock scaling or clock gating at the CMU 1850. The clock scaling circuitry and clock gating circuitry may be programmed via one or more registers in the CMU 1850 and/or the partitions (e.g., partition 1830). For example, the clock scaling circuitry of the CMU 1850 may adjust the clock frequency applied to the clock trunks based on application requirements; meeting latency/load requirements, for example, while consuming the lowest possible power or maintaining power consumption below a specified threshold. In one embodiment, the CMU 1850 operates automatically in response to clock request signals received by the clock satellite blocks 1851-1853 (e.g., clock gating one or more clock trunks in response to inactivity signals and enabling the clock trunks in response to activity signals).

In addition to traffic-based clock gating, one embodiment of the architecture allows all clock levels to be un-gated ahead of an anticipated traffic cycle, thereby ensuring that latency-critical traffic is processed in a timely manner. In one embodiment, this control is performed by firmware and/or software.

The embodiments of the invention provide for decentralized clock control based on detected activity, without the need for "always-on" circuitry to detect the activity. Rather, because these embodiments rely on combinational control signaling as described herein, entire partitions of a chip may be fully clock gated and reactivated only when useful work can be performed. A hysteresis counter is used in one embodiment to wait a specified amount of time after detecting inactivity before clock gating a partition.

The asynch active signals may be generated in response to various forms of activity within the blocks 1831-1833 and/or partitions 1810, 1820, 1830, 1840. By way of example, and not limitation, elements 1861-1864 are registers within blocks 1831-1834 which may trigger asynch active signals when accessed and/or updated. In one embodiment, the registers are configuration/control registers attached to an external bus to the partition used to read/write the registers (e.g., to read/write a new hysteresis value via a sideband channel). In one embodiment, the bus is back-pressured from the registers and this back-pressure is used as an activity signal to turn on the clocks for the associated register block 1831-1834, update one or more of the registers 1861-1864, and then turn off the clocks again. Thus, even when clocks are stopped, backpressure may be used as the activity indication which re-starts the clocks.

In one embodiment, while the PLLs for each clock trunk are integral to the clock satellite blocks 1851-1853, the clock gates are all managed within clock gating logic 1855 which can gate the clocks in response to signals from the clock satellites 1851-1853 or which includes clock dividers to scale the clocks (e.g., reducing the clock frequencies to conserve power as described above).

One embodiment of the invention implements failsafe techniques to turn on all clock gates in response to an exception or an unknown condition. This may be implement with a chicken bit which is set in response to such a condition and which causes the clock gating logic 1855 to enable all clocks to the clock trunks.

Figure 19:
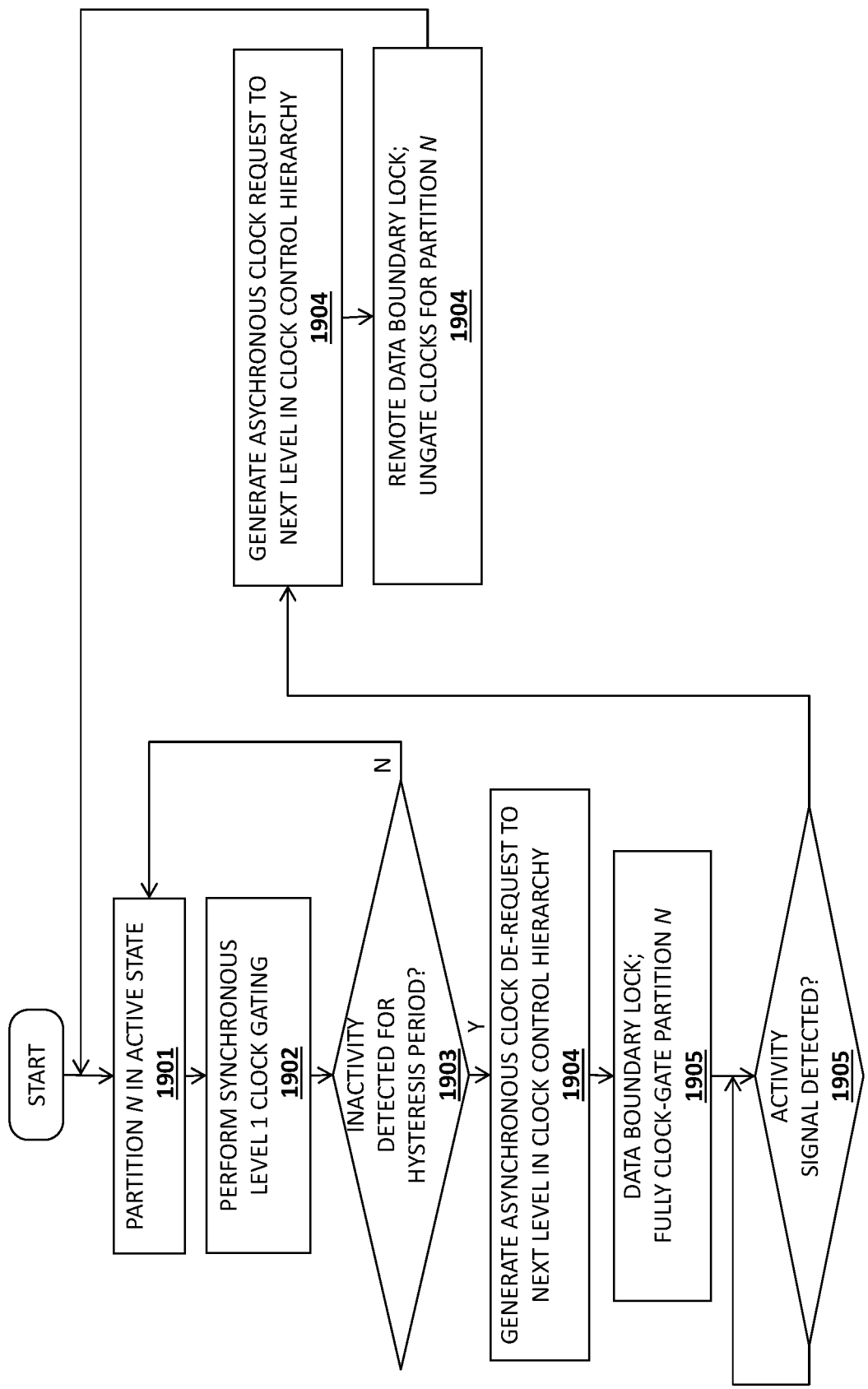
FIG. 19 illustrates one embodiment of a method for activity-based clock control.

A method in accordance with one embodiment of the invention is illustrated in FIG. 19. The method may be implemented on any of the architectures described herein, but is not limited to any particular architecture.

At 1901, a particular partition (partition N) is in an active state. As mentioned, even in an active state, synchronous "level 1" clock gating is performed within the partition at 1902. In response to detecting inactivity for the specified hysteresis time interval (e.g., based on the activity and/or asynch activity signals) at 1903, an asynchronous clock de-request is sent to the next level in the clock control hierarchy at 1904. For example, upon determining to gate clocks to partition N, the clock aggregator for partition N notifies the clock satellite block further up the hierarchy. In response, at 1905, a data boundary lock is performed and the clocks to partition N are fully gated (e.g., by clock gating logic at the clock satellite level). If new activity is detected within the hysteresis interval, then the process returns to 1901.

The process waits for a new activity signal at 1906, such as the async active signals from adjacent partitions and/or active signals from within partition N. In response to detecting the new activity signal at 1906, the aggregator of partition N generates an asynchronous clock request to the next level in the clock control hierarchy at 1907. At 1908, the data boundary lock is removed and the clocks for partition N are ungated.

Figure 20:
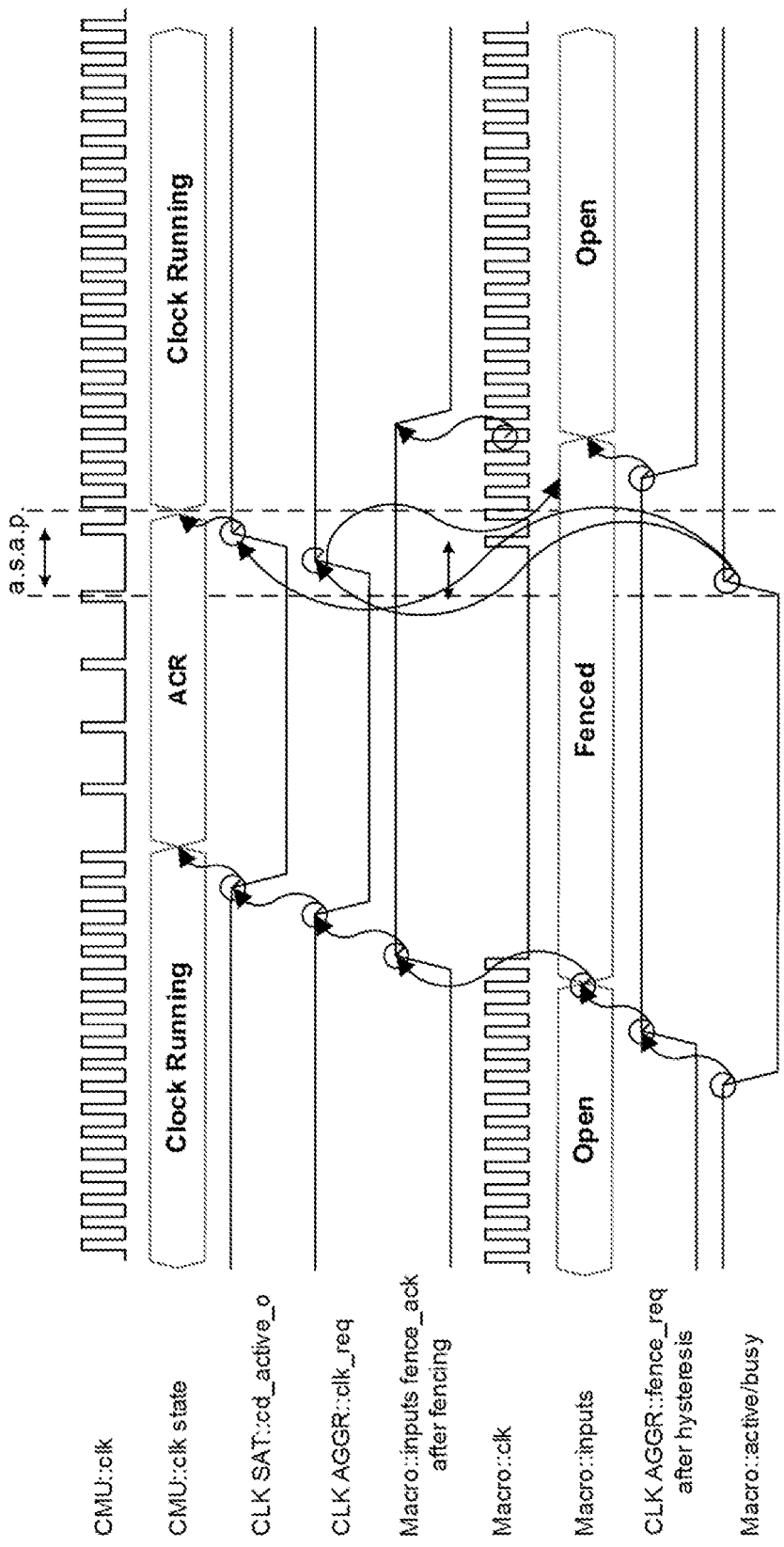
FIG. 20 illustrates example event signals associated with one embodiment of the invention.

FIG. 20 shows an example waveform of one complete clock gating/un-gating cycle of a layout macro. The idle period and the expiration of the programmed hysteresis wait time lead to clock trunk gating for the partition and a request for clock scaling at the CMU level. As depicted in FIG. 20, the clock is not required by any other partition and is therefore scaled down using a programmable down-scaling factor. In one embodiment, the down-scaling factor can be overwritten by firmware. Subsequently, the incoming traffic provides a wake-up request for the clock.

As mentioned above, the activation signal (e.g., async active) may be generated several cycles in advance to account for the latency in ungating the clocks to a partition. This embodiment factors in the communication delay of several clock cycles to the clock aggregator and/or clock satellite blocks but does avoids generating the activation signal so early that the clock is on and burning power before the data has arrived. In actual implementations, fine tuning of the activation signal timing has produced significant dynamic power reduction results with sparse traffic patterns. In contrast to previous solutions, the clock request logic does not require an "always on" power domain when its switchable region is fully powered down/clock gated.

In one embodiment, activity information for clock scaling may be provided to the clock source (e.g., the clock satellite blocks 1851-1853). Like the anticipatory gating described above, the activity information for clock scaling may include look-ahead information for upcoming data in order to reduce the clock un-scaling latency. In one embodiment, the activity information also includes state machine non-steady state information, so that power up/down cycles are as short as possible.

While only three levels of clock gating are illustrated in FIG. 18, additional hierarchical levels can be added following in the same manner as described herein. For example, a clock aggregator at "level 2" may generate a clock request to a parent clock aggregator at "Level 3" which generates clock requests to a clock satellite block at "Level 4."

The clock gating architecture described above allows for a smart, traffic-based and vertically integrated clocking system which may be incorporated into a cryogenic SoC to enable dynamic clock power reduction. The clock tree is partitioned in multiple hierarchy levels with activity-based control implemented in clock gating hardware in a domino style approach. To achieve maximum power reduction, the clock gates are controlled asynchronously, thereby allowing more freedom of placement and no running control clock. Every asynchronously controlled clock gate hierarchy may be equipped with idle period hysteresis control to prevent unwanted latency due to small operational idle gaps. These hysteresis intervals may be programmable and can be changed depending on the particular use case.

Figure 21:
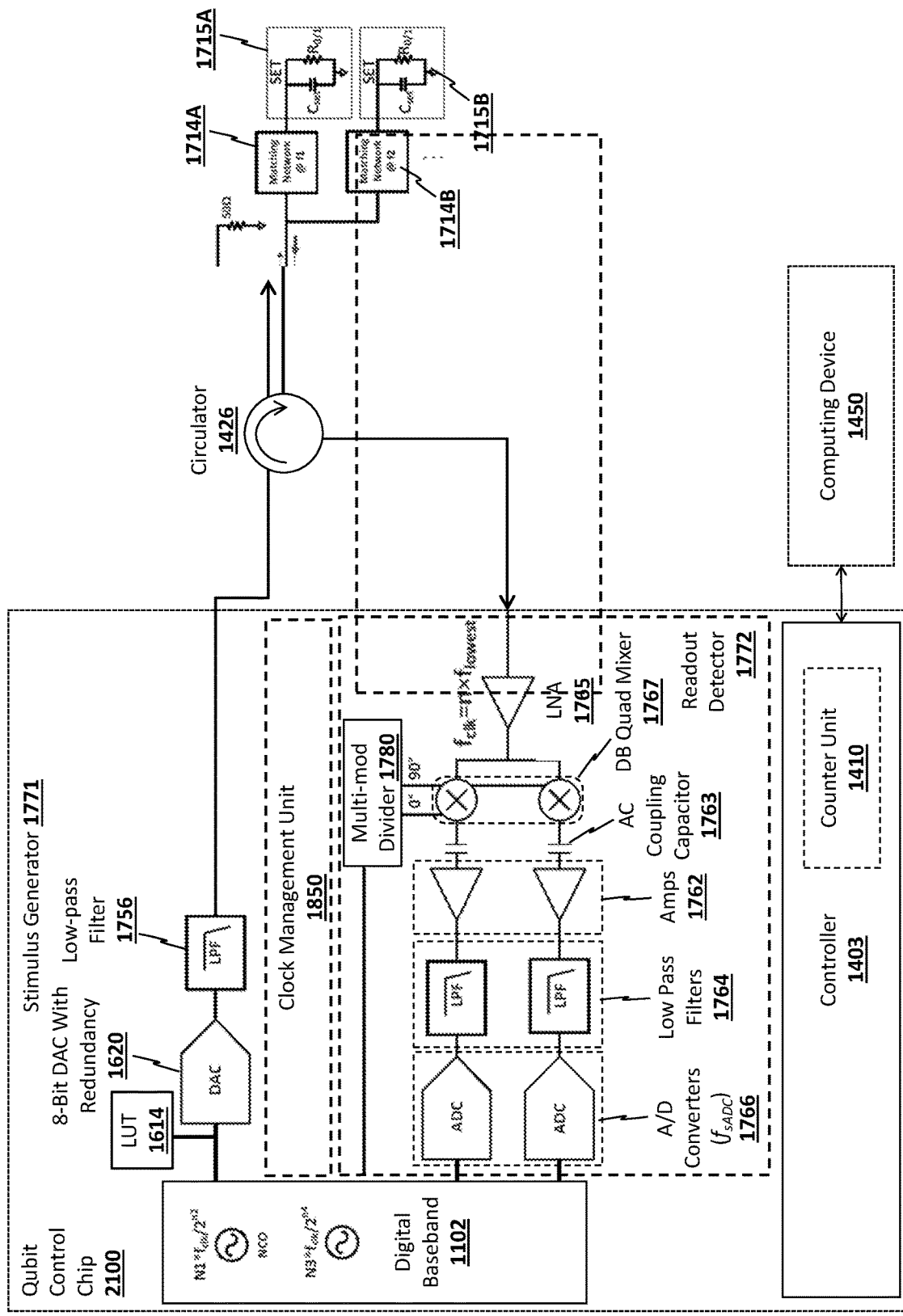
FIG. 21 illustrates one embodiment which includes technological features from various other embodiments.

The various technical features of the embodiments of the invention described above may be combined in any number of ways to further improve efficiency, reduce power consumption, reduce errors, and/or improve performance of a qubit controller. By way of example, and not limitation, FIG. 21 illustrates the 8-bit DAC with redundancy 1620 and associated LUT 1614, the clock management unit 1840 to implement hierarchical, asynchronous clock control with clock aggregators (not shown), the counter unit 1410 to count instances of I/Q components of reflected signals, and the multi-modulus divider 1780 to set the frequency relationship between the DB quad mixer 1767 and digital baseband 1102. Any of the other technical features described herein may (or may not) be used in the embodiment in FIG. 21. For example, in one embodiment, the techniques described with respect to FIGS. 11A-B and 12 for reducing reflections/interference when manipulating qubits may be used prior to taking measurements.

In the above detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

EXAMPLES

The following are example implementations of different embodiments of the invention.

Example 1. An apparatus comprising: a digital-to-analog (DAC) converter to generate an analog waveform in response to a digital baseband signal; one or more low-pass filters to filter the analog waveform to generate a filtered waveform; one or more mixers to generate a microwave waveform at a specified microwave frequency based on the filtered waveform; and a power amplifier (PA) having a PA output to be directly coupled to an interface of a qubit chip, the PA to amplify the microwave waveform to generate an amplified microwave waveform to manipulate a state of one or more qubits of the qubit chip, wherein the PA output has a characteristic impedance equal to a characteristic impedance of the interface to the quantum processor.

Example 2. The apparatus of example 1 wherein the impedance comprises 50Ω.

Example 3. The apparatus of example 1 wherein the interface of the quantum processor comprises an electron spin resonance (ESR) line.

Example 4. The apparatus of example 4 wherein the PA output is coupled directly to the ESR line without an attenuator or circulator coupled therebetween.

Example 5. The apparatus of example 1 further comprising: a short-to-ground switch coupled to the PA output, the short-to-ground switch to couple the PA output to ground to reduce noise propagation to the qubit chip during periods when no amplified microwave waveform is being generated.

Example 6. The apparatus of example 5 wherein the short-to-ground switch is integrated within the PA, the PA further comprising: a plurality of binary/thermometer-weighted power amplifier cells, each power amplifier cell comprising a differential cascode amplifier.

Example 7. The apparatus of example 6 wherein outputs of the binary/thermometer-weighted power amplifier cells are combined to produce an output signal, the PA further comprising: an output transformer, wherein the output signal is provided through a center tap of the output transformer.

Example 8. The apparatus of example 7 wherein to implement the short-to-ground switch, transistors of the cascode amplifier are turned on, shorting the outputs of the binary/thermometer-weighted power amplifier cells to ground.

Example 9. The apparatus of example 8 wherein to implement the short-to-ground switch, one or more center tap switches of the output transformer are disabled via an enable/disable line.

Example 10. An apparatus comprising: a stimulus generator to generate microwave pulses to control a state of a quantum bit (qubit) of a quantum processor; a reflectometry detector to detect waveforms having one or more quantifiable characteristics based on the state of the qubit; and a plurality of bin counters coupled to or integral to the reflectometry detector, a bin counter to be associated with a specified range of values for the one or more quantifiable characteristics of the waveforms.

Example 11. The apparatus of example 10 wherein the quantifiable characteristics comprise an in-phase (I) component and a quadrature (Q) component for each of the waveforms.

Example 12. The apparatus of example 11 wherein a first bin counter is to be configured to increment in response to detection of I/Q values falling within a first specified range of I/Q values defining a first region of interest (ROI), the first ROI associated with a first qubit state.

Example 13. The apparatus of example 12 wherein a second bin counter is to be configured to increment in response to detection of I/Q values falling within a second specified range of I/Q values defining a second region of interest (ROI), the second ROI associated with a second qubit state.

Example 14. The apparatus of example 13 wherein the first specified range of I/Q values is associated with a first qubit state and the second specified range of I/Q values is associated with a second qubit state.

Example 15. The apparatus of example 10 further comprising: a controller coupled to or including the plurality of bin counters, the controller including an interface for programming the plurality of bin counters, wherein different bin counters are to be incremented in response to receipt of corresponding different waveforms having different quantifiable characteristics.

Example 16. The apparatus of example 15 wherein the reflectometry detector comprises an electron spin resonance (ESR) interface to couple the reflectometry detector to an ESR line, the reflectometry detector to detect the waveforms received from the ESR interface.

Example 17. The apparatus of example 15 wherein the controller is to execute a sequence of quantum operations specified in quantum program code to cause the stimulus generator to generate the microwave pulses to control the state of the qubit and one or more additional qubits.

Example 18. The apparatus of example 17 wherein a plurality of qubit states are to be associated with a corresponding plurality of waveform values.

Example 19. The apparatus of example 18 wherein a waveform value associated with a particular qubit state comprises an in-phase (I) component and a quadrature (Q) component.

Example 20. An apparatus comprising: a stimulus generator to generate rectangular microwave pulses to control a state of a first quantum bit (qubit) of a quantum processor, the stimulus generator comprising: a digital-to-analog converter (DAC) with redundancy; a data structure mapping M-bit input values to N-bit DAC control values to control the DAC, the M-bit input values and N-bit DAC control values selected to linearize an input code-output voltage characteristic of the DAC; and a trigger signal generator to generate a rectangular pulse of a specified duration, wherein the DAC is to generate a voltage in accordance with the N-bit DAC value for a duration of the rectangular pulse.

Example 21. The apparatus of example 20 wherein the calibration structure comprises a lookup table having a plurality of entries, each entry mapping one of the M-bit input values to one of the N-bit DAC control values.

Example 22. The apparatus of example 21 wherein N is less than M and wherein the plurality of entries comprise $2^N$ entries.

Example 23. The apparatus of example 21 further comprising: calibration hardware logic comprising N input lines coupled to the DAC and bypassing the lookup table.

Example 24. The apparatus of example 23 wherein the redundancy of the DAC is configured to have negative differential nonlinearity (DNL) versus code, calibrated via the entries in the lookup table.

Example 25. The apparatus of example 21 wherein a specific voltage of an output microwave pulse generated by the DAC is selected in combination with the specified pulse duration to control the first qubit of the quantum processor based on predetermined characteristics of the first qubit.

Example 26. The apparatus of example 25 wherein the first qubit comprises a barrier qubit to control a voltage barrier between a second qubit and a third qubit, the second and third qubits comprising data qubits.

Example 27. The apparatus of example 26 wherein the microwave pulse at the specific voltage and duration is selected to lower the barrier voltage of the barrier qubit to allow interaction between the second qubit and the third qubit.

Example 28. The apparatus of example 26 further comprising: a first single electron transistor (SET) capacitively coupled to the first qubit, the first SET having a first impedance when the first qubit is in a first state and a second impedance with the first qubit is in a second state.

Example 29. The apparatus of example 28 further comprising: a matching network coupled to the first SET to match the first impedance.

Example 30. The apparatus of example 29 further comprising: an ESR line coupling the DAC to the matching network.

Example 31. The apparatus of example 28 further comprising: a second SET capacitively coupled to the second qubit and a third SET capacitively coupled to the third qubit.

Example 32. An apparatus comprising: a stimulus generator to generate microwave pulses to control a state of a quantum bit (qubit) of a quantum processor, the stimulus generator comprising: a digital-to-analog converter (DAC) to operate at a first frequency range and generate a stimulus signal at an amplitude to directly manipulate the qubit without requiring frequency translation by a mixer, wherein the first frequency range is selected to ensure that one or more filters will filter any harmonic tones produced by the DAC; and a low pass filter to filter the harmonic tones produced from the DAC prior to transmitting the stimulus signal to the qubit.

Example 33. The apparatus of example 32 further comprising: an electron spin resonance (ESR) interface to couple the stimulus generator to an ESR line, the ESR line electrically coupled, directly or indirectly, to the qubit, wherein the stimulus signal, when transmitted over the ESR line, is to change a state of the qubit.

Example 34. The apparatus of example 32 further comprising: a readout detector to process a reflected signal comprising a reflection of the stimulus signal from a single-electron transistor (SET) matching network, the reflected signal to be used to determine a current state of the qubit.

Example 35. The apparatus of example 34 wherein the readout detector further comprises: a mixer operable at a local oscillator (LO) frequency to frequency-convert the reflected signal to generate a frequency-converted signal; a digital baseband processor operable at a processor frequency to digitally process the frequency-converted signal; and clocking hardware logic to control the processor frequency and the LO frequency, and to ensure that the processor frequency is an integer multiple of the LO frequency.

Example 36. The apparatus of example 35 wherein the LO frequency is set to a value based on filtering capabilities of the readout detector, to ensure that any harmonics of the LO frequency fall within a range capable of being filtered.

Example 37. The apparatus of example 36 wherein the processor frequency is set to twice the LO frequency.

Example 38. The apparatus of example 36 wherein the readout detector further comprises: direct current (DC) blocking circuitry coupled between the mixer and the digital baseband processor, the DC blocking circuitry to remove a DC component of the frequency-converted signal; and Example 39. The apparatus of example 38 further comprising: one or more low pass filters to remove harmonics produced from the LO frequency.

Example 40. The apparatus of example 35 wherein the mixer comprises a double-balanced quadrature mixer to generate in-phase (I) and quadrature (Q) components of the frequency-converted signal.

Example 41. The apparatus of example 40 wherein the clocking hardware logic further comprises: a multi-modulus divider to set the LO frequency of the double-balanced quadrature mixer.

Example 42. An apparatus comprising: a plurality of functional partitions arranged to perform a corresponding plurality of functions in a processing pipeline; a plurality of clock aggregators to asynchronously control gating of clock signals provided to the plurality of functional partitions, based on activity signals generated by combinational logic indicating processing activity in the functional partitions.

Example 43. The apparatus of example 42 wherein an activity signal is modifiable by a partition via the combinational logic even when all clock signals to that partition are gated.

Example 44. The apparatus of example 42 further comprising: a first partition to perform a first function to generate a first result, the first partition to generate a first activity signal and a second activity signal, the first and second activity signals to be generated responsive to activity in the first partition; a second partition to process the first result to generate a second result; a first clock aggregator associated with the first partition to control gating of a first clock signal provided to the first partition based, at least in part, on the first activity signal; and a second clock aggregator associated with the second partition to control gating of a second clock signal provided to the second partition based, at least in part, on the second activity signal.

Example 45. The apparatus of example 44 wherein the second clock aggregator is to receive the second activity signal and begin un-gating the second clock signal several cycles before the first result is available for processing by the second partition.

Example 46. The apparatus of example 45 wherein the second partition is to generate a third activity signal responsive to activity in the second partition, wherein the second clock aggregator is to control gating of the second clock signal based on both the second activity signal and the third activity signal.

Example 47. The apparatus of example 46 wherein the first, second, and third activity signals are to indicate inactivity in a respective partition when inactivity is detected for a specified hysteresis interval.

Example 48. The apparatus of example 42 further comprising: a hierarchical clock management subsystem coupled to and/or integral to the plurality of functional partitions, comprising: a chip-level clock manager including one or more clock satellite blocks to control gating of a corresponding one or more source clock trunks, wherein each clock signal provided to a functional partition is provided from one of the source clock trunks; a partition-level clock manager comprising the plurality of clock aggregators or a subset thereof, a clock aggregator to asynchronously communicate with one of the clock satellite blocks when gating clocks to an associated partition; and circuit level clock gating logic to synchronously gate clocks to individual functional units within the plurality of functional partitions.

Example 49. The apparatus of example 48 wherein a clock satellite block is to receive a chip-level combinational activity signal from a subset of the clock aggregators associated with partitions supplied by the clock satellite block's clock trunk, the clock satellite block to determine whether to gate the clock trunk based on the chip-level combinational activity signal.

Example 50. The apparatus of example 49 further comprising: a plurality of processing blocks integral to at least one partition, each processing block to perform a specified function within the context of the partition; and a corresponding plurality of block-level clock aggregators to control gating of clocks provided to the respective plurality of processing blocks.

Example 51. The apparatus of example 50 further comprising: clock scaling hardware logic of the chip-level clock manager to scale a frequency of a clock of one or more of the clock trunks based on detected application requirements and/or thermal limitations.

Example 52. The apparatus of example 46 wherein the plurality of functional partitions comprise partitions in a quantum control chip, the plurality of functional partitions including: a first partition to perform digital baseband signal processing operations in response to execution of quantum control program code, the first partition further comprising a digital-to-analog (DAC) converter to generate analog microwave signals to be transmitted over a communication channel to control one or more qubits of a quantum processor; a second partition to perform frequency conversion and/or filtering of the analog microwave signals prior to transmission via the communication channel.

Example 53. The apparatus of example 52 further comprising: a third partition to receive reflected analog signals from the communication channel, the reflected analog signals comprising reflections of the analog microwave signals, the third partition comprising: one or more filters to remove unwanted frequencies from the reflected analog signals; one or more analog signal amplifiers to amplify the reflected analog signals to produce amplified analog signals; and one or more analog-to-digital (ADC) converters to convert the amplified analog signals to a digital baseband format to be processed by the first partition.

54. The apparatus of example 53 wherein the third partition further comprises: one or more analog mixers to convert the reflected analog signals and/or amplified analog signals from a first frequency to a second frequency.

Example 55. The apparatus of example 54 further comprising: a fourth partition comprising a quantum controller of the quantum control chip, the quantum controller to execute the quantum program code.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments. Terms like "first," "second," "third," etc. do not imply a particular ordering, unless otherwise specified.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a digital-to-analog (DAC) converter to generate an analog waveform in response to a digital baseband signal;
one or more low-pass filters to filter the analog waveform to generate a filtered waveform;
one or more mixers to generate a microwave waveform at a specified microwave frequency based on the filtered waveform; and
a power amplifier (PA) having a PA output to be directly coupled to an interface of a qubit chip, the PA to amplify the microwave waveform to generate an amplified microwave waveform to manipulate a state of one or more qubits of the qubit chip, wherein the PA output has a characteristic impedance equal to a characteristic impedance of the interface.

2. The apparatus of claim 1 wherein the impedance comprises 50Ω.

3. The apparatus of claim 1 wherein the interface comprises an electron spin resonance (ESR) line.

4. The apparatus of claim 3 wherein the PA output is coupled directly to the ESR line without an attenuator or circulator coupled therebetween.

5. The apparatus of claim 1 further comprising:
a short-to-ground switch coupled to the PA output, the short-to-ground switch to couple the PA output to ground to reduce noise propagation to the qubit chip during periods when no amplified microwave waveform is being generated.

6. The apparatus of claim 5 wherein the short-to-ground switch is integrated within the PA, the PA further comprising:
a plurality of binary/thermometer-weighted power amplifier cells, each power amplifier cell comprising a differential cascade amplifier.

7. The apparatus of claim 6 wherein outputs of the binary/thermometer-weighted power amplifier cells are combined to produce an output signal, the PA further comprising:
an output transformer, wherein the output signal is provided through a center tap of the output transformer.

8. The apparatus of claim 7 wherein to implement the short-to-ground switch, transistors of the cascade amplifier are turned on, shorting the outputs of the binary/thermometer-weighted power amplifier cells to ground.

9. The apparatus of claim 8 wherein to implement the short-to-ground switch, one or more center tap switches of the output transformer are disabled via an enable/disable line.

\* \* \* \* \*